US010704254B2

(12) United States Patent
Seabaugh et al.

(10) Patent No.: US 10,704,254 B2
(45) Date of Patent: Jul. 7, 2020

(54) EASY TO APPLY AIR AND WATER BARRIER ARTICLES

(71) Applicant: 3M INNOVATIVE PROPERTIES COMPANY, St. Paul, MN (US)

(72) Inventors: Taylor M. Seabaugh, Minneapolis, MN (US); Martin J. Widenbrant, Stillwater, MN (US); Daniel R. Fronek, Woodbury, MN (US); Alan J. Hollo, Dassel, MN (US); Jayshree Seth, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/120,046

(22) PCT Filed: Feb. 18, 2015

(86) PCT No.: PCT/US2015/016362
§ 371 (c)(1),
(2) Date: Aug. 18, 2016

(87) PCT Pub. No.: WO2015/126931
PCT Pub. Date: Aug. 27, 2015

(65) Prior Publication Data
US 2017/0058510 A1 Mar. 2, 2017

Related U.S. Application Data

(60) Provisional application No. 62/095,321, filed on Dec. 22, 2014, provisional application No. 61/941,160, filed on Feb. 18, 2014.

(51) Int. Cl.
*B32B 7/12* (2006.01)
*E04B 1/62* (2006.01)
*B32B 27/32* (2006.01)
*B32B 27/06* (2006.01)
*B32B 27/36* (2006.01)
*C09J 7/20* (2018.01)
*C09J 7/21* (2018.01)
*C09J 7/40* (2018.01)

(52) U.S. Cl.
CPC ............. *E04B 1/625* (2013.01); *B32B 7/12* (2013.01); *B32B 27/065* (2013.01); *B32B 27/32* (2013.01); *B32B 27/36* (2013.01); *C09J 7/205* (2018.01); *C09J 7/21* (2018.01); *C09J 7/401* (2018.01); *B32B 2266/08* (2013.01); *B32B 2307/7242* (2013.01); *B32B 2307/7265* (2013.01); *B32B 2405/00* (2013.01); *B32B 2419/00* (2013.01); *C09J 2201/122* (2013.01); *C09J 2201/134* (2013.01); *C09J 2201/28* (2013.01); *C09J 2201/606* (2013.01); *C09J 2400/263* (2013.01); *C09J 2423/046* (2013.01); *C09J 2467/005* (2013.01); *C09J 2471/006* (2013.01); *C09J 2483/005* (2013.01)

(58) Field of Classification Search
None
See application file for complete search history.

(56) References Cited

U.S. PATENT DOCUMENTS

| | | | |
|---|---|---|---|
| 3,039,893 A | 6/1962 | Banigan | |
| 3,169,899 A | 2/1965 | Steuber | |
| 3,426,754 A | 2/1969 | Bierenbaum | |
| 3,532,589 A | 10/1970 | David | |
| 3,627,722 A | 12/1971 | Seiter | |
| 3,632,557 A | 1/1972 | Brode | |
| 3,711,445 A | 1/1973 | Chu | |
| 3,831,342 A | 8/1974 | Rejsa | |
| 3,900,102 A | 8/1975 | Hurst | |
| 3,937,640 A | 2/1976 | Tajima | |
| 4,067,844 A | 1/1978 | Barron | |
| 4,153,594 A | 5/1979 | Wilson, Jr. | |
| 4,201,808 A * | 5/1980 | Cully | C09D 183/06 427/387 |
| 4,345,053 A | 8/1982 | Rizk | |
| 4,366,307 A | 12/1982 | Singh | |
| 4,374,237 A | 2/1983 | Berger | |
| 4,543,403 A | 9/1985 | Isayama | |
| 4,576,999 A | 3/1986 | Eckberg | |
| 4,593,068 A | 6/1986 | Hirose | |
| 4,618,653 A | 10/1986 | Kawakubo | |
| 4,618,656 A | 10/1986 | Kawakubo | |

(Continued)

FOREIGN PATENT DOCUMENTS

| | | |
|---|---|---|
| EP | 0676403 | 10/1995 |
| EP | 2868468 | 5/2015 |
| GB | 2473618 | 3/2011 |
| JP | S4536319 B | 11/1970 |
| JP | S54-6096 | 1/1979 |
| JP | S55-13767 | 1/1980 |
| JP | S55-13768 | 1/1980 |

(Continued)

OTHER PUBLICATIONS

"Kaneka MS Polymer", Kaneka Texas Corporation, Dec. 8, 2017.*

(Continued)

*Primary Examiner* — Anish P Desai

(57) ABSTRACT

There are provided rolls comprising an air and water barrier article having opposing first and second major surfaces, a pressure sensitive adhesive disposed on at least the first major surface of the article, and a liner having a first major surface that contacts the opposing second major surface of the article, wherein the pressure sensitive adhesive contacts a second major surface of the liner when wound in the roll. There are also provided self adhering air and water barrier articles and building envelopes made using the presently disclosed rolls.

20 Claims, 4 Drawing Sheets

(56) References Cited

U.S. PATENT DOCUMENTS

| | | |
|---|---|---|
| 4,645,816 A | 2/1987 | Pohl |
| 4,654,417 A | 3/1987 | Inoue |
| 4,687,818 A | 8/1987 | Kawakubo |
| 4,751,122 A | 6/1988 | May |
| 4,774,356 A | 9/1988 | Inoue |
| 4,822,451 A * | 4/1989 | Ouderkirk ............... B29C 59/16 156/272.2 |
| 4,900,772 A | 2/1990 | Imanaka |
| 4,904,732 A | 2/1990 | Iwahara |
| 4,904,745 A | 2/1990 | Inoue |
| 4,923,650 A | 5/1990 | Antoon, Jr. |
| 4,960,844 A | 10/1990 | Singh |
| 5,068,304 A | 11/1991 | Higuchi |
| 5,120,594 A | 6/1992 | Mrozinski |
| 5,223,583 A | 6/1993 | Higuchi |
| 5,316,848 A | 5/1994 | Bartlett |
| 5,317,035 A | 5/1994 | Jacoby |
| 5,348,791 A | 9/1994 | Thompson |
| 5,364,955 A | 11/1994 | Zwiener |
| 5,374,477 A | 12/1994 | Lawless |
| 5,593,771 A | 1/1997 | Lawless |
| 5,756,751 A | 5/1998 | Schmalstieg |
| 5,811,566 A | 9/1998 | Watabe |
| 5,882,573 A | 3/1999 | Kwok |
| 5,895,301 A * | 4/1999 | Porter ........................ B32B 5/26 156/71 |
| 5,972,147 A | 10/1999 | Janis |
| 5,986,014 A | 11/1999 | Kusakabe |
| 5,990,257 A | 11/1999 | Johnston |
| 6,001,946 A | 12/1999 | Waldman |
| 6,046,270 A | 4/2000 | Roesler |
| 6,176,961 B1 | 1/2001 | Mossbeck et al. |
| 6,197,912 B1 | 3/2001 | Huang |
| 6,361,634 B1 | 3/2002 | White |
| 6,495,229 B1 | 12/2002 | Carte et al. |
| 6,534,129 B1 | 3/2003 | Miller et al. |
| 6,645,887 B2 | 11/2003 | Kocinec et al. |
| 6,706,225 B2 | 3/2004 | Cabrey |
| 7,060,750 B2 | 6/2006 | Jansen |
| 7,094,859 B2 | 8/2006 | Schindler |
| 7,153,923 B2 | 12/2006 | Schindler |
| 7,351,296 B2 | 4/2008 | Waggoner |
| 7,682,675 B2 | 3/2010 | Boge |
| 7,718,250 B2 | 5/2010 | Sieber |
| 7,846,504 B2 | 12/2010 | Maier |
| 7,867,591 B2 | 1/2011 | Sieber |
| 8,061,098 B2 | 11/2011 | Whelan |
| 8,277,915 B2 | 10/2012 | Couturier |
| 8,334,227 B2 | 12/2012 | Tee et al. |
| 8,399,088 B2 | 3/2013 | Deng |
| 8,535,786 B2 | 9/2013 | Schroer |
| 8,609,213 B2 | 12/2013 | Wiercinski et al. |
| 8,613,181 B2 | 12/2013 | Jay |
| 8,826,611 B2 | 9/2014 | Veilleux et al. |
| 8,931,228 B2 | 1/2015 | Wiercinski et al. |
| 8,931,229 B2 | 1/2015 | Wiercinski et al. |
| 8,986,786 B2 | 3/2015 | Maier |
| 9,192,960 B2 | 11/2015 | Tanley |
| 9,238,203 B2 | 1/2016 | Scheibner |
| 9,266,144 B2 | 2/2016 | Maier |
| 9,394,464 B2 | 7/2016 | Wiercinski et al. |
| 9,476,196 B2 | 10/2016 | Wiercinski et al. |
| 9,562,174 B2 * | 2/2017 | Russell ..................... B32B 7/12 |
| 9,731,314 B2 | 8/2017 | Maier |
| 2002/0108564 A1 | 8/2002 | Gruenewald |
| 2003/0051807 A1 | 3/2003 | Yamaguchi |
| 2003/0056722 A1 | 3/2003 | Kitano et al. |
| 2003/0165651 A1 | 9/2003 | Sieber |
| 2003/0180468 A1 * | 9/2003 | Cray ..................... C09D 183/04 427/387 |
| 2004/0081794 A1 | 4/2004 | Titone |
| 2004/0103608 A1 | 6/2004 | Lionel |
| 2004/0137813 A1 | 7/2004 | Faucher |
| 2004/0180195 A1 * | 9/2004 | Macuga ..................... B32B 7/12 428/343 |
| 2004/0224117 A1 * | 11/2004 | Amano ............... B29C 47/0021 428/40.1 |
| 2005/0028938 A1 | 2/2005 | Hill |
| 2005/0058798 A1 | 3/2005 | Sieber |
| 2005/0069698 A1 * | 3/2005 | Eubanks .................. B44C 1/10 428/354 |
| 2005/0137549 A1 | 6/2005 | Lindsay et al. |
| 2006/0040091 A1 * | 2/2006 | Bletsos .................. B32B 5/022 428/137 |
| 2007/0042196 A1 | 2/2007 | Smith |
| 2007/0060732 A1 | 3/2007 | Yang |
| 2007/0282080 A1 * | 12/2007 | Kawakami ......... C08G 65/2609 525/455 |
| 2008/0058492 A1 | 3/2008 | Griswold |
| 2008/0114098 A1 | 5/2008 | Griswold |
| 2008/0135159 A1 | 6/2008 | Bries |
| 2008/0153924 A1 | 6/2008 | Caron |
| 2010/0012882 A1 | 1/2010 | Sherman |
| 2010/0307658 A1 | 12/2010 | Galush et al. |
| 2011/0151169 A1 | 6/2011 | Maier |
| 2011/0244742 A1 | 10/2011 | Huang |
| 2012/0088052 A1 | 4/2012 | Cantu |
| 2012/0174508 A1 | 7/2012 | Brooks |
| 2012/0207998 A1 | 8/2012 | Ando |
| 2013/0059105 A1 | 3/2013 | Wright |
| 2013/0084419 A1 | 4/2013 | Taylor |
| 2013/0196163 A1 | 8/2013 | Swanson |
| 2013/0274700 A1 | 10/2013 | Harris |
| 2014/0093679 A1 | 4/2014 | Okamoto |
| 2014/0186566 A1 | 7/2014 | Wood |
| 2015/0225614 A1 | 8/2015 | Kim |
| 2015/0267076 A1 | 9/2015 | Bodkhe |
| 2015/0368508 A1 | 12/2015 | Bodkhe |
| 2017/0072430 A1 * | 3/2017 | Maier ...................... B05C 5/025 |
| 2017/0173916 A1 * | 6/2017 | Widenbrant .............. B32B 5/02 |
| 2018/0001595 A1 * | 1/2018 | Seabaugh ................ B32B 7/06 |
| 2018/0237662 A1 * | 8/2018 | Widenbrant .......... B32B 27/065 |

FOREIGN PATENT DOCUMENTS

| | | |
|---|---|---|
| JP | S57-164123 | 10/1982 |
| JP | S64-22904 | 1/1989 |
| JP | H06-172631 | 6/1994 |
| JP | H06-211922 | 8/1994 |
| JP | 11071823 | 3/1999 |
| JP | H11-60724 | 3/1999 |
| JP | H11-100427 | 4/1999 |
| JP | H11-116763 | 4/1999 |
| JP | 2000-169545 | 6/2000 |
| JP | 2001-072854 | 3/2001 |
| JP | 2001-294830 | 10/2001 |
| JP | 2001-323040 | 11/2001 |
| JP | 2002-155145 | 5/2002 |
| JP | 2002-212415 | 7/2002 |
| JP | 3313360 | 8/2002 |
| JP | 2002-249538 | 9/2002 |
| JP | 2008-303650 | 12/2008 |
| WO | WO 1998-056866 | 12/1998 |
| WO | WO 2002-01013 | 1/2002 |
| WO | WO 2012-092019 | 7/2012 |
| WO | WO 2013-032771 | 3/2013 |
| WO | WO 2013-136108 | 9/2013 |
| WO | WO 2014-047018 | 3/2014 |
| WO | WO 2013-168777 A1 | 3/2015 |

OTHER PUBLICATIONS

Bries, James et al., "Stretch releasing pressure-sensitive articles and method of using the same", abstract of CN 105331298A, published Feb. 17, 2016 (Year: 2016).*

Han, Yonglai, "Self-adhesive aluminum plastic compound waterproof anti-corrosion coiled material", abstract of CN 1869375 A, published Nov. 29, 2006 (Year: 2006).*

Feng Xiong, "BAC polymer composite self-adhering water-proof coiled material", abstract of CN 201047117Y, published Apr. 16, 2008 (Year: 2008).*

(56) References Cited

OTHER PUBLICATIONS

Nakajima, Tomohito et al., "Adhesive Tape", machine translation of JP 2004-137405A, published May 13, 2004 (Year: 2004).*
Definition of "substrate" from Oxford English Dictionary, retrived on Jun. 28, 2018 (Year: 2018).*
Mukhopadhyay, "A Review on Designing the Waterproof Breathable Fabrics Part I: Fundamental Principles and Designing Aspects of Breathable Fabrics", 2008, Journal of Industrial Textiles, vol. 37, No. 3, pp. 225-262.
Wang, "Controlled"Living" Radical Polymerization. Atom Transfer Radical Polymerization in the Presence of Transition-Metal Complexes", J. Am. Chem. Soc, 1995, vol., 117, pp. 5614-5615.
International Search report for PCT International PT Application PCT/US2015/016362 dated May 20, 2015, 3 pages.

* cited by examiner

EASY TO APPLY AIR AND WATER BARRIER ARTICLES

CROSS REFERENCE TO RELATED APPLICATIONS

This application is a national stage filing under 35 U.S.C. 371 of PCT/US2015/016362, filed Feb. 18, 2015, which claims the benefit of U.S. Application No. 61/941,160, filed Feb. 18, 2014, and U.S. Application No. 62/095,321, filed Dec. 22, 2014, the disclosures of which are incorporated by reference in their entirety herein.

FIELD

The present disclosure relates to easy to apply air and water barrier articles and rolls thereof. The present disclosure also is related to self adhering air and water barrier articles and building envelopes made using these air and water barrier articles.

BACKGROUND

Air barrier systems control movement of air, and specifically water vapor, across a surface of a structure, such as a building enclosure. In exterior walls, uncontrolled air flow is the greatest source of moisture and condensation damage. Indoor comfort is affected by air temperature, relative humidity, direction of airflow and surrounding surface temperatures. Indoor air quality is enhanced by air barrier systems by efficiently keeping pollutants out of building interiors. Pollutants include water vapor, suspended particulates, dust, insects, smells, etc. Air barrier systems have significant impact on electricity consumption and gas bills. Air barrier systems in nonresidential buildings are estimated to reduce air leakage by up to 83 percent, reduce gas bills more than 40% and reduce electricity consumption more than 25% according to simulations by the National Institute of Standards and Technology (NIST) compared to typical buildings without air barriers. Water vapor is a key ingredient in corrosion and mold growth. Air barrier systems help prevent water vapor from being transported by air movement between exteriors and interiors of structures, such as buildings.

The use of air barrier systems has been a requirement in Canada for almost 25 years and is becoming important in North America due to net zero energy requirements by 2030, required by the US Army Corp of Engineering, ASHRAE 90, and International Energy Conservation Code—2009. On Dec. 16, 2011, the DC Construction Codes Coordinating Board (CCCB) adopted the 2012 International Energy Conservation Code (IECC).

Previously known waterproofing sheets having both waterproofing property and moisture permeability have been developed. One typical example of such moisture-permeable waterproofing sheets is flash-spun nonwoven fabrics. U.S. Pat. No. 3,169,899, for example, discloses a flash-spun nonwoven fabric. U.S. Pat. No. 3,532,589 discloses a method for producing a flash-spun nonwoven fabric. The nonwoven fabric thus obtained has an appropriate pore size. It blocks water, but allows water vapor to pass therethrough. A known example of the nonwoven fabric is commercially available under the trade designation "Tyvek" from E. I. Du Pont de Nemours and Company, Wilmington, Del. USA obtained by thermo-compressing a three-dimensionally-meshed fiber of high-density polyethylene. Such a moisture-permeable waterproofing sheet can prevent external water from infiltrating through the sheet, but can drain gathered moisture as water vapor.

However, the openings such as windows or doors are not flat. It is difficult to form a waterproofing layer only with a waterproofing sheet, and therefore the opening is often finished with a waterproofing tape with a pressure sensitive adhesive layer provided thereon. In this case, since the pressure sensitive adhesive layer is made of rubber or asphalt materials, the moisture vapor permeability of the entire tape decreases, and the same problem as that of a common waterproofing sheet can occur.

Mechanical fasteners or adhesive fasteners, such as pressure sensitive adhesive tapes, can be used to affix the moisture-vapor permeable waterproofing sheet on substrates of exterior walls or to affix overlapped portions of two moisture-vapor permeable waterproofing sheets. As a result, moisture may permeate from gaps of such fasteners, such as nail holes, over a long period of time. It is beneficial for such moisture-vapor permeable waterproofing sheets to pass ASTM D-1970/D-1970M-13 or similar modified tests such as Modified Test 1 of ASTM D-1970/D-1970M-13, Modified Test 2 of ASTM D-1970/D-1970M-13, or Modified Test 3 of ASTM D-1970/D-1970M-13 for nail sealability. It is also beneficial to provide easy application of the air and water barrier article to substrates, such as building components. Because self-adhered air barrier articles are used in wide width format, they can be difficult to handle. Application of air barrier articles is simplified if the release liner comes off on the external face of the air barrier article. This allows for removal of the liner after the air barrier article has been applied to a surface rather than simultaneously removing the liner while the air barrier article is being applied or removing the liner before application of the air barrier article.

It is also beneficial for the adhesives provided on the air barrier articles to provide robust adhesion in a variety of conditions. For example, it is beneficial for such an adhesive to adhere to wet substrates, which are common conditions on surfaces of building components at a construction site.

SUMMARY

There exists a need for that, when wound in a roll with a release liner, provides appropriate release of the release liner from the article and an adhesive used to coat at least a portion of the article. There exists a need for air and water barrier articles that provide nail sealability according to Modified Test 1 of ASTM D-1970/D-1970M-13, Modified Test 2 of ASTM D-1970/D-1970M-13, or Modified Test 3 of ASTM D-1970/D-1970M-13. There is also a need for these air and water barrier articles to provide acceptable permeability performance with respect to water vapor according to ASTM E96/E96M-13. There is also a need for providing easy application of the air and water barrier article to substrates, such as building components. There exists a need for at least one adhesive provided on the air barrier articles to provide robust adhesion in a variety of conditions, such as for example wet surfaces.

In one aspect, present disclosure provides a roll comprising an air and water barrier article having opposing first and second major surfaces, a pressure sensitive adhesive disposed on at least the first major surface of the article, and a liner having a first major surface that contacts the opposing second major surface of the article, wherein the pressure sensitive adhesive contacts a second major surface of the liner when wound in the roll.

In some embodiments, a release strength between the second major surface of the liner and the pressure sensitive adhesive is less than or equal to a release strength between the first major surface of the liner and the second major surface of the article. In some embodiments, the liner is coated on at least one of the major surfaces with a release coating. In some embodiments, the roll further comprises surface modification at the interface between the second major surface of the article and the first major surface of the liner.

In some embodiments, a width of the article is greater than or equal to 18 inches. In some embodiments, the article is used in building envelope applications. In some embodiments, the liner comprises a film selected from at least one of polyester film, paper, polyethylene film, wherein the film is coated on at least one of the major surfaces with a release coating.

In some embodiments, the liner is derived from applying a layer comprising a (meth)acrylate-functional siloxane to a major surface of a substrate; and irradiating said layer, in a substantially inert atmosphere comprising no greater than 500 ppm oxygen, with a short wavelength polychromatic ultraviolet light source having at least one peak intensity at a wavelength of from about 160 nanometers to about 240 nanometers to at least partially cure the layer, optionally wherein the layer is cured at a curing temperature greater than 25° C.

In some embodiments, the article passes Modified Test 1 of ASTM D-1970/D-1970M-13, Modified Test 2 of ASTM D-1970/D-1970M-13, or Modified Test 3 of ASTM D-1970/D-1970M-13. In some embodiments, the article is water vapor permeable. In some embodiments, the article comprises a porous layer at least partially impregnated with a polymeric material wherein a first major surface of the porous layer is covered with the polymeric material.

In some embodiments, the article comprises a porous layer at least partially impregnated and encapsulated with a polymeric material. In some embodiments, the article comprises a major surface of a porous layer that is coated with a polymeric material. In some embodiments, the pressure sensitive adhesive comprises a first pressure sensitive adhesive that is pattern coated on the first major surface of the article. In some embodiments, the article further comprises a second pressure sensitive adhesive that is pattern coated on the first major surface of the article.

In some embodiments, the first and sensitive adhesives are different pressure sensitive adhesives. In some embodiments, the polymeric material comprises a polyoxyalkylene polymer having at least one end group derived from an alkoxy silane. In some embodiments, all of the end groups of the polyoxyalkylene polymer are silyl terminated. In some embodiments, the polyoxyalkylene polymer further comprises at least one silyl modified branched group. In some embodiments, the polymeric material is a solid material or a foam material. In some embodiments, the foam material comprises closed cell foam.

In another aspect, the present disclosure provides a self adhering air and water barrier article derived from the roll of any of the preceding embodiments. In some embodiments, the self adhering air and water barrier article is disposed on a major surface of a building component.

Various aspects and advantages of exemplary embodiments of the present disclosure have been summarized. The above Summary is not intended to describe each illustrated embodiment or every implementation of the present disclosure. Further features and advantages are disclosed in the embodiments that follow. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
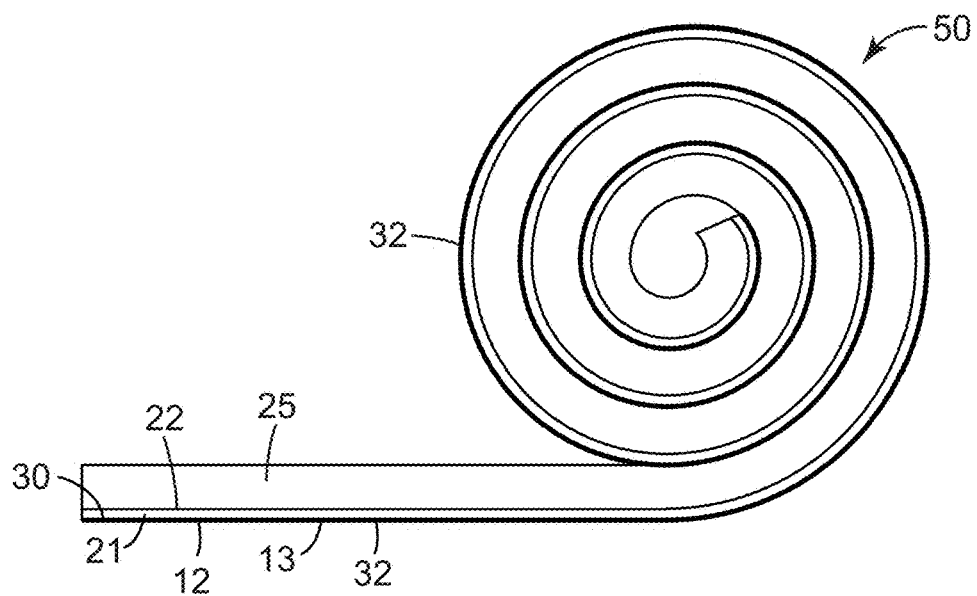
FIG. 1 is a cross section view of a roll of an air and water barrier article, pressure sensitive adhesive, and liner according to the present disclosure.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

As used in this specification, the recitation of numerical ranges by endpoints includes all numbers subsumed within that range (e.g. 1 to 5 includes 1, 1.5, 2, 2.75, 3, 3.8, 4, and 5, and the like).

Unless otherwise indicated, all numbers expressing quantities or ingredients, measurement of properties and so forth used in the Specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following defined terms, these definitions shall be applied for the entire Specification, including the claims, unless a different definition is provided in the claims or elsewhere in the Specification based upon a specific reference to a modification of a term used in the following Glossary:

Glossary

The words "a", "an", and "the" are used interchangeably with "at least one" to mean one or more of the elements being described.

The term "layer" refers to any material or combination of materials on or overlaying a substrate.

Words of orientation such as "atop, "on," "covering," "uppermost," "overlaying," "underlying" and the like for describing the location of various layers, refer to the relative position of a layer with respect to a horizontally-disposed, upwardly-facing substrate. It is not intended that the substrate, layers or articles encompassing the substrate and layers, should have any particular orientation in space during or after manufacture.

The terms "about" or "approximately" with reference to a numerical value or a shape means+/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

By using the term "overcoated" to describe the position of a layer with respect to a substrate or other element of an article of the present disclosure, we refer to the layer as being atop the substrate or other element, but not necessarily contiguous to either the substrate or the other element.

The term "separated by" to describe the position of a layer with respect to another layer and the substrate, or two other layers, means that the described layer is between, but not necessarily contiguous with, the other layer(s) and/or substrate.

The term "(co)polymer" or "(co)polymeric" includes homopolymers and copolymers, as well as homopolymers or copolymers that may be formed in a miscible blend, e.g., by coextrusion or by reaction, including, e.g., transesterification. The term "copolymer" includes random, block, graft, and star copolymers.

The term "homogeneous" means exhibiting only a single phase of matter when observed at a macroscopic scale.

The term "(meth)acrylate" with respect to a monomer, oligomer or means a vinyl-functional alkyl ester formed as the reaction product of an alcohol with an acrylic or a methacrylic acid.

The term "adjoining" with reference to a particular layer means joined with or attached to another layer, in a position wherein the two layers are either next to (i.e., adjacent to) and directly contacting each other, or contiguous with each other but not in direct contact (i.e., there are one or more additional layers intervening between the layers).

The term "permeable" as used herein means an article having a permeance of more than 1 perm (inch-pounds units) according to ASTM E 96 Procedure A (Desiccant Method).

The term "discontinuous" as used herein means a coating having an interrupted extension along a two dimensional surface. For example, in some embodiments, an air and water barrier article having a discontinuous coating of pressure sensitive adhesive does not cover a major surface of a polymeric material or a major surface of a porous layer.

The term "perforated" as used herein means materials allowing passage of liquids at ambient conditions.

The term "microporous" as used herein means a material that is permeable to moisture vapor, but impermeable to liquid water at 55 cm of water pressure.

The term "air and water barrier" as used herein means material that is designed and constructed to provide the principal plane of air tightness through an environmental separator and that has an air permeance rate no greater than 0.02 L per square meter per second at a pressure difference of 75 Pa when tested in accordance with ASTM E 2178-13 and provides acceptable barrier performance with respect to water according to AATCC 127-2013.

The presently disclosed rolls include adhesives used on the air barrier articles to provide robust adhesion in a variety of conditions. For example, in some embodiments, air barrier articles derived from the presently disclosed rolls adhere to adhere to wet substrates, such as for example the surfaces of building components. In some embodiments, air barrier articles derived from the presently disclosed rolls provide robust adhesion when used in a combination of harsh conditions, such as for example both wet and cold surfaces on building components.

Referring now to FIG. 1, the present disclosure provides a roll 50 comprising an air and water barrier article 21 having opposing first and second major surfaces 13, 22, a pressure sensitive adhesive 25 disposed on at least the first major surface of the article 22, and a liner 12 having a first major surface 30 that contacts the opposing second major surface of the article 13, wherein the pressure sensitive adhesive 25 contacts a second major surface of the liner 32 when wound up in the roll. In some embodiments a release strength between the second major surface 32 of the liner 12 and the pressure sensitive adhesive 25 is less than or equal to a release strength between the first major surface 30 of the liner 12 and the second major surface 13 of the air and water barrier article 21. In some embodiments, the liner 12 is coated on at least one of the major surfaces 30, 32 with a release coating.

In some embodiments, surface modification is optionally used at the interface between the second major surface 13 of the article 21 and the first major surface 30 of the liner 12. In some embodiments width of the article in the transverse direction is greater than or equal to 18 inches.

Liner

Various commercially available liners may be used in the present disclosure. Exemplary commercially available liners include those available under the trade designations "2.0 CL PET U4162/U4162" and "4 BU DHP UE1094B/000" from Loparex, Hammond, Wis. Other commercially available materials are also useful as liners in the present disclosure, such as for example a red pigmented, multilayer, thermoplastic olefin film containing a proprietary blend of high density polyethylene and low density polyethylene, having a thickness of about 63 micrometers (0.0025 inches), commercially available from Iso Poly Films, Incorporated, Gray Court, S.C. In some embodiments, the liner substrate comprises a film selected from at least one of polyester, paper, or polyethylene film.

In some embodiments, the film is coated on at least one of its major surfaces with a release coating. In some embodiments both major sides of the liner substrate are coated with a release coating. In this case, the release coating may the same or different on each of the major surfaces of the liner. Materials useful as release coatings in the present disclosure include, for example, silicones, siloxanes, fluoropolymers, urethanes, polyethylene, and the like.

The liner may be produced using known processing techniques. For example, liner processing techniques such as those disclosed in US 20130059105 (Wright et al.) may be used to produce a liner useful in the present disclosure.

An exemplary liner processing technique may include the steps of: applying a layer comprising a (meth)acrylate-functional siloxane to a major surface of a substrate; and irradiating that layer, in a substantially inert atmosphere comprising no greater than 500 ppm oxygen, with a short wavelength polychromatic ultraviolet light source having at least one peak intensity at a wavelength of from about 160 nanometers to about 240 nanometers to at least partially cure the layer. In some embodiments, the layer is cured at a curing temperature greater than 25° C.

Air and Water Barrier Article

Figure 2A:
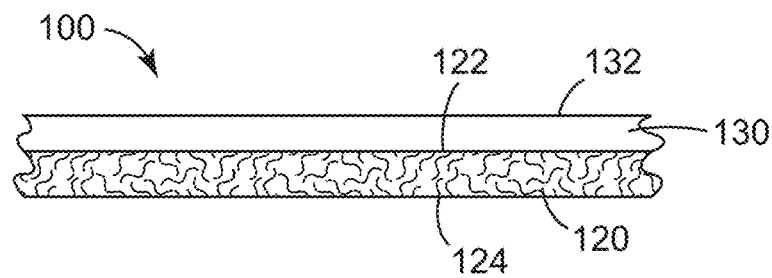
FIG. 2A is a side cross section view of an exemplary embodiment of an air and water barrier article according to the present disclosure.

Referring now to FIG. 2A, in some embodiments, presently disclosed air and water barrier articles 100 include a porous layer 120 that is at least partially impregnated 110 (not shown) with a polymeric material 130 where a first major surface 122 of the porous layer 120 is covered with the polymeric material 130. These air and water barrier articles 100 meet the requirements of Modified Test 1 of ASTM D-1970/D-1970M-13, Modified Test 2 of ASTM D-1970/D-1970M-13, Modified Test 3 of ASTM D-1970/D-1970M-13, or combinations thereof. In some embodiments, the presently disclosed air and water barrier articles 100 are water vapor permeable and barriers to air and water. In some embodiments, the presently disclosed air and water barrier articles 100 include a layer of pressure sensitive adhesive useful for adhering the air and water barrier 100 articles to various surfaces.

In some embodiments, the presently disclosed air and water barrier articles 100 include a pressure sensitive adhesive disposed on a second major surface 124 of the porous layer 120, a major surface 132 of the polymeric material 130, and combinations thereof. In some embodiments, the pressure sensitive adhesive is discontinuously disposed on at least one of the aforementioned surfaces 124, 132 in a random manner. In some embodiments, the pressure sensitive adhesive is discontinuously disposed on at least one of the aforementioned surfaces 124, 132 in a patterned manner. In some embodiments, the pressure sensitive adhesive covers at least one of 10% to 90% of the second major surface 124 of the porous layer 120, 10% to 90% of the major surface 132 of the polymeric material 130, or 10% to 90% of both the second major surface 124 of the porous layer 120 and the major surface 132 of the polymeric material 130. In some embodiments, the pressure sensitive adhesive is a permeable pressure sensitive adhesive that is continuously disposed on at least one of a second major surface 124 of the porous layer 120, a major surface 132 of the polymeric material 130, or combinations thereof.

Figure 2B:
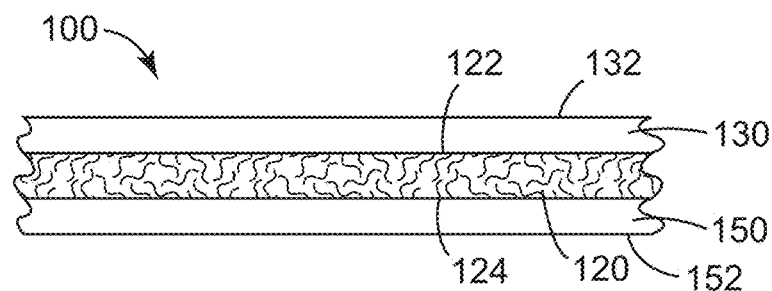
FIG. 2B is a side cross section view of an exemplary embodiment of an air and water barrier article according to the present disclosure.

Referring now to FIG. 2B, in some embodiments, presently disclosed air and water barrier articles 100 include a porous layer 120 is impregnated (not shown) and encapsulated with the polymeric material 130, 150. These air and water barrier articles 100 meet the requirements of Modified Test 1 of ASTM D-1970/D-1970M-13, Modified Test 2 of ASTM D-1970/D-1970M-13, Modified Test 3 of ASTM D-1970/D-1970M-13, or a combination thereof. In some embodiments, the presently disclosed air and water barrier articles 100 are water vapor permeable and barriers to air and water. In some embodiments, the presently disclosed air and water barrier articles 100 include a layer of pressure sensitive adhesive useful for adhering the air and water barrier articles 100 to various surfaces.

In some embodiments, the pressure sensitive adhesive disposed on at least one of the outer major surfaces 132, 152 of the polymeric material 130, 150. In some embodiments, the pressure sensitive adhesive is discontinuously disposed on at least one of the outer major surfaces 132, 152 of the polymeric material 130, 150. In some embodiments, the pressure sensitive adhesive is discontinuously disposed on at least one of the outer major surfaces 132, 152 of the polymeric material 130, 150 in a random manner. In some embodiments, the pressure sensitive adhesive is discontinuously disposed on at least one of the outer major surfaces 132, 152 of the polymeric material 130, 150 in a patterned manner. In some embodiments, the pressure sensitive adhesive covers 10% to 90% of the surface area of the outer major surfaces 132, 152 of the polymeric material 130, 150. In some embodiments, the pressure sensitive adhesive is a permeable pressure sensitive adhesive that is continuously disposed on at least one outer major surface 132, 152 of the polymeric material 130, 150.

Figure 3:
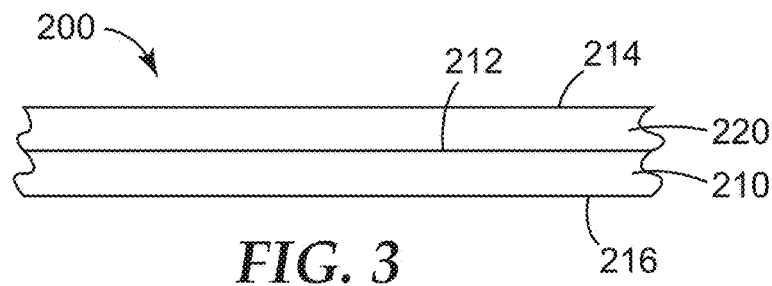
FIG. 3 is a side cross section view of an exemplary embodiment of an air and water barrier article according to the present disclosure.

Referring now to FIG. 3, in some embodiments, presently disclosed air and water barrier articles 200 include a major surface 212 of a porous layer 210 that is coated with a polymeric material 220, wherein the porous layer 210 comprises a microporous membrane. These air and water barrier articles 200 meet the requirements of Modified Test 1 of ASTM D-1970/D-1970M-13, Modified Test 2 of ASTM D-1970/D-1970M-13, Modified Test 3 of ASTM D-1970/D-1970M-13, or a combination thereof. In some embodiments, the presently disclosed air and water barrier articles 200 are water vapor permeable and barriers to air and water. In some embodiments, the presently disclosed air and water barrier articles 200 include a layer of pressure sensitive adhesive useful for adhering the air and water barrier articles 200 to various surfaces.

In some embodiments, the presently disclosed air and water barrier articles 200 include a pressure sensitive adhesive disposed on a second major surface 216 of the porous layer 210, a major surface 214 of the polymeric material 220, and combinations thereof. In some embodiments, the pressure sensitive adhesive is discontinuously disposed on at least one of the aforementioned surfaces 214, 216 in a random manner. In some embodiments, the pressure sensitive adhesive is discontinuously disposed on at least one of the aforementioned surfaces 214, 216 in a patterned manner. In some embodiments, the pressure sensitive adhesive covers at least one of 10% to 90% of the second major surface 216 of the porous layer 210, 10% to 90% of the major surface 214 of the polymeric material 220, or 10% to 90% of both the second major surface 216 of the porous layer 210 and the major surface 214 of the polymeric material 220. In some embodiments, the pressure sensitive adhesive is a permeable pressure sensitive adhesive that is continuously disposed on at least one of a second major surface 216 of the porous layer 210, a major surface 214 of the polymeric material 220, or combinations thereof.

Porous Layer

In some embodiments, materials useful in the presently disclosed porous layer include perforated polymeric materials. In some embodiments, perforated polymeric material is selected from polyolefin, oriented polyolefin, polyester, oriented polyester, multilayer films and combinations thereof. Exemplary perforated materials are those disclosed in WO 2011/081894 (A1), which is herein incorporated by reference in its entirety.

In some embodiments, the porous layer is a nonwoven selected from at least one of polyester, polylactic acid, polyolefin, polyamide, rayon and combinations thereof. In some embodiments, the porous layer comprises blown microfibers. In some embodiments, the porous layer includes at least one of the following materials: extruded netting, scrims, and the like. In some embodiments, the porous layer is a woven material.

In some embodiments, the porous layer is microporous membrane. Suitable microporous membranes include thermally induced phase separated porous membranes such as that described in U.S. Pat. No. 5,120,594. Such membranes are commercially available under the trade designation "ProPore" from 3M., Minneapolis, Minn. Suitable microporous membranes also include stretched calcium carbonate filled polyolefin film as described in U.S. Pat. No. 4,923,650. Such membranes are commercially available under the trade designation "Micropro" from Clopay Plastics, Mason, Ohio. Suitable microporous membranes preferably spunbonded or fibrous bonded polyolefin as described in U.S. Pat. Nos. 3,532,589 and 5,972,147. In some instances, the polyolefins are cast, annealed and then stretched. Preferred polyolefins are polyethylene and polypropylene. One suitable microporous membrane is commercially available under the trade designation "TYVEK" from E.I. DuPont deNemours Corp., Wilmington, Del. Other suitable microporous membranes include oriented polymeric films as described in U.S. Pat. No. 5,317,035, and which comprise ethylene-propylene block copolymers. Such membranes are commercially available under the trade designation "APTRA films" from BP-Amoco Corp., Atlanta, Ga. Suitable microporous membranes can be formed from immiscible polymer materials or polymer materials that have an extractable component, such as solvent. These materials are stretched after casting.

In some embodiments, the porous layer has a moisture vapor transmission rate of greater than or equal to 1 perm, preferably greater than or equal to 5 perms, and more preferably greater than or equal to 10 perms.

Polymeric Material

In some embodiments, the presently disclosed polymeric material includes a polyoxyalkylene polymer having at least one end group derived from an alkoxy silane. The polyoxyalkylene polymer may be silyl terminated. In some embodiments, the polyoxyalkylene polymer further comprises at least one silyl modified branched group.

Materials useful in the presently disclosed polymeric material include solid materials and foam materials. In some embodiments, the foam material includes closed cell foams.

Other ingredients useful in the presently disclosed polymeric materials include various additives such as dehydrating agents, rheology additives, compatibilizers, tackifiers, physical property modifiers, photocurable substances, oxygen-curable substances, storage stability improving agents, fillers, epoxy resins, epoxy resin curing agents antioxidants, adhesion promoters, ultraviolet absorbers, metal deactivators, antiozonants, antioxidants, light stabilizers, lubricants, amine type radical chain inhibitors, phosphorus-containing peroxide decomposers, lubricants, pigments, foaming agents, solvents, flame retardants, antifungal agents, blowing agents, and antistatic agents, each in an adequate amount. These additives may be added singly to the curable composition or two or more thereof may be added in combination to the curable composition. Specific examples of these additives are disclosed in publications such as Japanese Kokoku Publications H4-69659 and H7-108928, and Japanese Kokai Publications S63-254149, S64-22904, 2001-72854, and 2008-303650.

In the polymeric materials of the present invention, there may further be added UV stabilizers or antioxidants in an amount of from 0-5 parts per 100 parts silyl terminated polymer. These materials improve heat stability and UV resistance, although the later effect is less important when the sealer composition of the invention is painted over. Useful UV stabilizers and antioxidants include those available under the trade designations "TINUVIN 770", "TINUVIN 327", "TINUVIN 1130" and "TINUVIN 292" from Ciba-Geigy.

The silyl terminated polymers useful in the present disclosure are commercially available from Kaneka Corporation under the trade designations "KANEKA MS POLYMER" and "KANEKA SILYL", and from Union Carbide Specialty Chemicals Division under the trade designations "SILMOD-SAT10", "SILMOD SAT30", "SILMOD SAT 200", "SILMOD S203", "SILMOD S303", "SILMOD 20A", to name several, which were obtained from Union Carbide Company. It is explained that trade named "SILMOD" resins are the same basic chemistries as some trade named "MS" resins available from Kanegafuchi Kagaku Kogyo Kabushiki Kaisha, Osaka Japan, e.g., the sealer available under trade designation "SILMOD S203" corresponds to the sealer available under trade designation "MS S203", the sealer available under trade designation "SILMOD S303" corresponds to the sealer available under trade designation "MS S303", and the sealer available under trade designation "SILMOD 20A" corresponds to the sealer available under trade designation "MS 20A". Further, the trade designated "SILMOD" resins are the same basic chemistries as some trade designated "SILYL" resins also available from Kanegafuchi Kagaku Kogyo Kabushiki Kaisha, Osaka Japan, e.g., the sealer available under the trade designation "SILMOD SAT10" corresponds to the sealer available under the trade designation "SILYL SAT10", the sealer available under the trade designation "SILMOD SAT30" corresponds to the sealer available under the trade designation "SILYL SAT30", and the sealer available under the trade designation "SILMOD 200" corresponds to the sealer available under the trade designation "SILYL 200".

A production method of a polyoxyalkylene polymer having a reactive silicon group may include those proposed in Japanese Kokoku Publication S45-36319, Japanese Kokoku Publication S46-12154, Japanese Kokai Publication S50-156599, Japanese Kokai Publication S54-6096, Japanese Kokai Publication S55-13767, Japanese Kokai Publication S55-13468, Japanese Kokai Publication S57-164123, Japanese Kokoku Publication H3-2450, U.S. Pat. Nos. 3,632,557, 4,345,053, 4,366,307, and 4,960,844, etc. Also, polyoxyalkylene polymers having a number average molecular weight of 6,000 or higher and a Mw/Mn ratio of 1.6 or lower and thus having high molecular weight and narrow molecular weight distribution as disclosed in Japanese Kokai Publication S61-197631, Japanese Kokai Publication S61-215622, Japanese Kokai Publication S61-215623, Japanese Kokai Publication S61-218632, Japanese Kokai Publication H3-72527, Japanese Kokai Publication H3-47825, and Japanese Kokai Publication H8-231707 can be exemplified, and is not limited to these examples.

In some embodiments, the main chain of the polyoxyalkylene polymer may contain another component such as a urethane bond component in an extent that the effect of the present disclosure is not significantly adversely affected. The aforementioned urethane bond component is not particularly limited and may include a group (hereinafter, also referred to as an amido segment) produced by reaction of an isocyanato group and an active hydrogen group.

The amido segment is a group represented by the following formula (I):

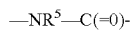

(wherein $R^5$ represents a hydrogen atom or a monovalent organic group, desirably a substituted or unsubstituted monovalent $C_{1-20}$ hydrocarbon group, and more desirably a substituted or unsubstituted monovalent $C_{1-8}$ hydrocarbon group).

The aforementioned amido segment may specifically include a urethane group produced, for example, by reaction of an isocyanato group and a hydroxy group; a urea group produced by reaction of an isocyanato group and an amino group; and a thiourethane group produced by reaction of an isocyanato group and a mercapto group. Also, in the present disclosure, groups produced by reaction of an active hydrogen in the aforementioned urethane group, urea group, and thiourethane group further with an isocyanato group are also included as the group represented by the formula I.

Examples of methods for industrially easily producing a polyoxyalkylene polymer having an amido segment and a reactive silicon group include those disclosed in Japanese Kokoku Publication S46-12154 (U.S. Pat. No. 3,632,557), Japanese Kokai Publications S58-109529 (U.S. Pat. No. 4,374,237), S62-13430 (U.S. Pat. No. 4,645,816), H8-53528 (EP 0676403), and H10-204144 (EP 0831108), Japanese Kohyo Publication 2003-508561 (U.S. Pat. No. 6,197,912), Japanese Kokai Publications H6-211879 (U.S. Pat. No. 5,364,955), H10-53637 (U.S. Pat. No. 5,756,751), H11-100427, 2000-169544, 2000-169545 and 2002-212415, Japanese Patent No. 3,313,360, U.S. Pat. Nos. 4,067,844 and 3,711,445, Japanese Kokai Publications 2001-323040, H11-279249 (U.S. Pat. No. 5,990,257), 2000-119365 (U.S. Pat. No. 6,046,270), S58-29818 (U.S. Pat. No. 4,345,053), H3-47825 (U.S. Pat. No. 5,068,304), H11-60724, 2002-155145, and 2002-249538, WO03/018658, WO03/059981, and Japanese Kokai Publication H6-211879 (U.S. Pat. No. 5,364,955), H10-53637 (U.S. Pat. No. 5,756,751), H10-204144 (EP0831108), 2000-169544, 2000-169545, 2000-119365 (U.S. Pat. No. 6,046,270).

A (meth) acrylic ester polymer having a reactive silicon group may be added to the curable composition of the present invention if necessary. A (meth) acrylic ester monomer composing the main chain of the above-mentioned (meth) acrylic ester polymer is not particularly limited and various monomers may be used. Examples thereof include (meth) acrylic ester monomers such as methyl (meth) acrylate, ethyl (meth) acrylate, n-propyl (meth) acrylate, isopropyl (meth) acrylate, n-butyl (meth) acrylate, isobutyl (meth) acrylate, t-butyl (meth) acrylate, n-pentyl (meth) acrylate, n-hexyl (meth) acrylate, cyclohexyl (meth) acrylate, n-heptyl (meth) acrylate, n-octyl (meth) acrylate, 2-ethylhexyl (meth) acrylate, isooctyl (meth) acrylate, nonyl (meth) acrylate, decyl (meth) acrylate, dodecyl (meth) acrylate, phenyl (meth) acrylate, tolyl (meth) acrylate, benzyl (meth) acrylate, 2-methoxyethyl (meth) acrylate, 3-methoxybutyl (meth) acrylate, 2-hydroxyethyl (meth) acrylate, 2-hydroxypropyl (meth) acrylate, stearyl (meth) acrylate, glycidyl (meth) acrylate, 2-aminoethyl (meth) acrylate, gamma-(methacryloyloxypropyl) trimethoxysilane, gamma-(methacryloyloxypropyl) dimethoxymethylsilane, methacryloyloxymethyltrimethoxysilane, methacryloyloxymethyltriethoxysilane, methacryloyloxymethyldimethoxymethylsilane, methacryloyloxymethyldiethoxymethylsilane, ethylene oxide adduct of (meth) acrylic acid, trifluoromethylmethyl (meth) acrylate, 2-trifluoromethylethyl (meth) acrylate, 2-perfluoroethylethyl (meth) acrylate, 2-perfluoroethyl-2-perfluorobutylethyl (meth) acrylate, perfluoroethyl (meth) acrylate, trifluoromethyl (meth) acrylate, bis (trifluoromethyl) methyl (meth) acrylate, 2-trifluoromethyl-2-perfluoroethylethyl (meth) acrylate, 2-perfluorohexylethyl (meth) acrylate, 2-perfluorodecylethyl (meth) acrylate, and 2-perfluorohexadecylethyl (meth) acrylate.

With respect to the (meth) acrylic ester polymer, the following vinyl monomers can be copolymerized together with a (meth) acrylic ester monomer. Examples of the vinyl monomer are styrene monomers such as styrene, vinyltoluene, alpha-methylstyrene, chlorostyrene, styrenesulfonic acid and its salts; fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride, maleic acid, and monoalkyl and dialkyl esters of maleic acid; fumaric acid, and monoalkyl and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amido group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; and vinyl chloride, vinylidene chloride, allyl chloride, and allyl alcohol. They may be used alone or a plurality of them may be copolymerized. Of them, in terms of properties such as the physical properties of a produced material, polymers comprising a styrene monomer and/or a (meth) acrylic acid monomer are desirable. (Meth) acrylic ester polymers comprising acrylic ester monomers and/or a methacrylic ester monomer are more desirable and acrylic ester polymers comprising acrylic ester monomers are further desirable. In the present disclosure, these desirable monomers may be copolymerized with other monomers and also block-copolymerized with them. In that case, these desirable monomers are desirably contained at a ratio of 40% by weight or higher. In the above descriptions, (meth) acrylic acid means acrylic acid and/or methacrylic acid.

A synthesis method of the (meth) acrylic ester polymer is not particularly limited and a conventionally known method may be employed. A polymer obtained by a common free radical polymerization method using an azo compound, a peroxide or the like as a polymerization initiator has a problem that the molecular weight distribution value is generally as high as 2 or higher and the viscosity is thus high. Accordingly, a living radical polymerization method is desirably employed in order to obtain a (meth) acrylic ester polymer having narrow molecular weight distribution and low viscosity and having a crosslinkable functional group at a molecular chain end at a high ratio. Of the "living radical polymerization methods", an "atom transfer radical polymerization method" for polymerizing a (meth) acrylic ester monomer using an organic halide, a halogenated sulfonyl compound or the like as an initiator and a transition metal complex as a catalyst has, in addition to the characteristics of the above-mentioned "living radical polymerization methods", a wide range of the options of the initiator and the catalyst because a halogen, etc. which is relatively advantageous for the functional group conversion reaction is located at a molecular chain end. The atom transfer radical polymerization method is therefore further desirable as a production method of the (meth) acrylic ester polymer having a specified functional group. Examples of the atom transfer radical polymerization method are, for example, the method disclosed in Krzysztof Matyjaszewski et al., J. Am. Chem. Soc, vol. 117, p. 5614 (1995).

Examples of a production method of the (meth) acrylic ester polymer having a reactive silicon group are production methods employing free radical polymerization methods using chain transfer agents and disclosed in Japanese Kokoku Publication H3-14068, Japanese Kokoku Publication H4-55444, and Japanese Kokai Publication H6-211922. Also, a production method employing an atom transfer radical polymerization method is disclosed in Japanese Kokai Publication H9-272714 and the like; and the method is not limited to these exemplified methods. The above-mentioned (meth) acrylic ester polymers having a reactive silicon group may be used alone or two or more kinds of them may be used in combination. A method for producing an organic polymer involving blending a polyoxyalkylene polymer having a reactive silicon group with a (meth) acrylic ester polymer having a reactive silicon group is not particularly limited, and examples thereof include those disclosed in Japanese Kokai Publication S59-122541, S63-11264, H6-172631, and H11-116763. Further, a production method of the polyoxyalkylene polymer obtained by blending the (meth) acrylic ester polymer having a reactive silicon group may also include a method of polymerizing a (meth) acrylic ester monomer in the presence of a polyoxyalkylene polymer having a reactive silicon group. The methods are practically disclosed in Japanese Kokai Publication S59-78223, Japanese Kokai Publication S59-168014, Japanese Kokai Publication S60-228516, and Japanese Kokai Publication S60-228517, and are not particularly limited to them.

In some embodiments, the presently disclosed polymeric materials include at least 0.1 wt %, and preferably at least 0.5 wt % of one or more water scavengers, and at most 5 wt % and preferably not more than 2 wt % of one or more water scavengers. Examples of water scavengers are silanes such as vinyltrimethoxysilane, vinyltriethoxysilane, vinylmethyldimethoxysilane, O-methylcarbamatomethyl-methyldimethoxysilane, O-methylcarbamatomethyl-trimethoxysilane, O-ethylcarbamatomethyl-methyldiethoxysilane, O-ethylcarbamatomethyl-triethoxysilane, 3-methacryloyloxypropyl-trimethoxysilane, methacryloyloxymethyl-trimethoxysilane, methacryloyloxymethylmethyldimethoxysilane, methacryloyloxymethyltriethoxysilane, methacryloxymethylmethyl-diethoxysilane, 3-acryloxyoylpropyl-trimethoxysilane, acryloyloxymethyltrimethoxysilane, acryloyloxymethylmethyldimethoxysilane, acrylmethyltriethoxysilane, acryloyloxymethylmethyldiethoxysilane, alkylalkoxysilanes in general, or else further organofunctional silanes and other aminosilanes which are described as catalysts.

In some embodiments, the presently disclosed polymeric materials include at least 0.1 wt %, preferably at least 0.5 wt % of one re more adhesion promoters. In some embodiments, the presently disclosed polymeric materials include at most 5 wt %, preferably not more than 2 wt % of one or more adhesion promoters. Useful sources of adhesion promoters include those available under the trade designations "A1120", "A187", and "A189" from OSI and "Z9020" from Dow Chemical Amino silanes can be used as adhesion promoters. Specific examples of the amino silane including adhesion promoters are gamma-aminopropyltrimethoxysilane, gamma-aminopropyltriethoxysilane, gamma-aminopropyltriisopropoxysilane, gamma-aminopropylmethyldimethoxysilane, gamma-aminopropylmethyldiethoxysilane, gamma-(2-aminoethyl)aminopropyltrimethoxysilane, gamma-(2-aminoethyl)aminopropylmethyldimethoxysilane, gamma-(2-aminoethyl)aminopropyltriethoxysilane, gamma-(2-aminoethyl)aminopropylmethyldiethoxysilane, gamma-(2-aminoethyl)aminopropyltriisopropoxysilane, gamma-(6-aminohexyl)aminopropyltrimethoxysilane, 3-(N-ethylamino)-2-methylpropyltrimethoxysilane, 2-aminoethylaminomethyltrimethoxysilane, N-cyclohexylaminomethyltriethoxysilane, N-cyclohexylaminomethyldiethoxymethylsilane, gamma-ureidopropyltrimethoxysilane, gamma-ureidopropyltriethoxysilane, N-phenyl-gamma-aminopropyltrimethoxysilane, N-phenylaminomethyltrimethoxysilane, N-benzyl-gamma-aminopropyltrimethoxysilane, N-vinylbenzyl-gamma-aminopropyltriethoxysilane, N,N'-bis[3-trimethoxysilyl]propyl]ethylenediamine, N-cyclohexylaminomethyltrimethoxysilane, N-cyclohexylaminomethyldimethoxymethylsilane, and N-phenylaminomethyltrimethoxysilane.

In some embodiments, the presently disclosed polymeric material may comprise one or more catalysts. The catalyst is preferably present in the presently disclosed polymeric material in an amount of from about 0.05 wt % to about 5 wt %, more preferably from about 0.1 wt % to about 2 wt %, most preferably from about 0.1 wt % to about 1 wt %. Organometallic compounds which are used as silanol condensation catalyst are preferred. The silanol condensation catalyst may be used in an amount of from about 0.01 to about 20 parts by weight per 100 parts by weight of the silyl-terminated polymer, with a more preferred addition level being from about 0.1 to about 10 parts by weight per 100 parts by weight of the silyl-terminated polymer. Examples of silanol condensation catalysts include, but are not limited to, titanate esters such as tetrabutyl titanate and tetrapropyl titanate; organotin compounds such as dibutyltin dilaurate, dibuytltin maleate, dibutyltin diacetate, stannous octoate, stannous napthenate, reaction products from dibutyltin oxide and phthalate esters, and dibutyltin diacetylacetonate; organoaluminum compounds such as aluminum trisacetylacetonate, aluminum tris(ethylacetoacetate) and diisopropylaluminum (ethylacetoacetate); reaction products from bismuth salts and organic carboxylic acids, such as bismuth tris(2-ethylhexonate) and bismuth tris(neodecanoate); chelate compounds such as zirconium tetra-acetylacetonate and titanium tetra-acetylactonate; organolead compounds such as lead octoate; organovanadium compounds; amine compounds such as butylamine, octylamine, dibutylamine, monoethanolamine, oleylamine, cyclohexylamine, benzylamine, diethylaminopropylamine, xylenediamine, triethylenediamine, guanidine, diphenylguanidine, 2,4,6-tris(dimethylaminomethyl)phenol, morpholine, N-methylmorpholine, 2-ethyl-4-methylimidazole with carboxylic or other acids; low-molecular-weight polyamide resins derived from excess polyamines and polybasics acids; and reaction products from excess polyamines and epoxy compounds. These may be used individually or in combination. The amine compounds are not limited to one mentioned above.

In some embodiments, the presently disclosed polymeric materials may comprise one or more pigments or fillers. Useful fillers are typically solids that are non-reactive with the other components of the compositions of the invention. Useful fillers include, for example, dye particles, pigments and colorants (for example, titanium dioxide or carbon black), glass beads, metal oxide particles, silica particles, ceramic microspheres, hollow polymeric microspheres (such as those available under the trade designation "EXPANCEL 551 DE" from Akzo Nobel, Duluth, Ga.), hollow glass microspheres (such as those available under the trade designation "K37" from 3M Co., St Paul, Minn.), carbonates, metal oxides, silicates (e.g. talc, asbestos, clays, mica), sulfates, silicon dioxide and aluminum trihydrate.

Some specific examples include ground or light calcium carbonate (with or without a surface-treatment such as a fatty acid, resin acid, cationic surfactant, or anionic surfactant); magnesium carbonate; talc; sulfates such as barium sulfate; alumina; metals in powder form (e.g., aluminum, zinc and iron); bentonite; kaolin clay; quartz powder; and combinations of two or more.

Examples of useful organic pigments include halogenated copper phthalocyanines, aniline blacks, anthraquinone blacks, benzimidazolones, azo condensations, arylamides, diarylides, disazo condensations, isoindolinones, isoindolines, quinophthalones, anthrapyrimidines, flavanthrones, pyrazolone oranges, perinone oranges, beta-naphthols, arylamides, quinacridones, perylenes, anthraquinones, dibromanthrones, pyranthrones, diketopyrrolo-pyrrole pigments (DPP), dioxazine violets, copper and copper-free phthalocyanines, indanthrones, and the like.

Examples of useful inorganic pigments include titanium dioxide, zinc oxide, zinc sulphide, lithopone, antimony oxide, barium sulfate, carbon black, graphite, black iron oxide, black micaceous iron oxide, brown iron oxides, metal complex browns, lead chromate, cadmium yellow, yellow oxides, bismuth vanadate, lead chromate, lead molybdate, cadmium red, red iron oxide, Prussian blue, ultramarine, cobalt blue, chrome green (Brunswick green), chromium oxide, hydrated chromium oxide, organic metal complexes, laked dye pigments and the like.

The filler can also comprise conductive particles (see, for example, U.S. Patent Application Pub. No. 2003/0051807, which is incorporated herein by reference) such as carbon particles or metal particles of silver, copper, nickel, gold, tin, zinc, platinum, palladium, iron, tungsten, molybdenum, solder or the like, or particles prepared by covering the surface of these particles with a conductive coating of a metal or the like. It is also possible to use non-conductive particles of a polymer such as polyethylene, polystyrene, phenol resin, epoxy resin, acryl resin or benzoguanamine resin, or glass beads, silica, graphite or a ceramic, whose surfaces have been covered with a conductive coating of a metal or the like.

Preferred fillers include inorganic solids such, for example, talc, titanium dioxide, silica, zirconia, calcium carbonate, calcium magnesium carbonate, glass or ceramic microspheres, and combinations thereof. In some embodiments, titanium dioxide and/or calcium carbonate are preferred.

In some embodiments, the polymeric material comprises plasticizers. If appropriate, the polymeric material can be produced with additional use of plasticizers in which case the plasticizers used do not contain any groups reactive toward silane/alkoxysilane. Plasticizers which can be utilized in the resinous compositions of the present disclosure include plasticizers such as polyethers, polyether esters, esters of organic carboxylic acids or anhydrides thereof, such as phthalates, for example dioctyl phthalate, diisononyl phthalate or diisodecyl phthalate, adipates, for example dioctyl adipate, azelates and sebacates. Specific examples are the dialkyl phthalates such as di-(2-ethyl-hexyl)-pththalates, dibutyl phthalate, diethyl phthalate, dioctyl phthalate, butyl octyl phthalate; dicyclohexyl phthalate, butyl benzyl phthalate; triaryl phosphates such as tricresyl phosphate, triphenyl phosphate, cresyl(liphenyl phosphate; trialkyl phosphates such as trioctyl phosphate and tributyl phosphate; alkoxyalkyl phosphates such as trisbutoxyethyl phosphate: alkyl aryl phosphates such as octyldiphenyl phosphate; alkyl adipates such as di-(2-ethylhexyl)adipate, diisooctyl adipate, octyl decyladinate; dialkyl sebacates such as dibutyl sebacate, dioctylsebacate, diisooctyl sebacate; alkyl azelates such as di(2-ethylhexyl)azelate and di-(2-ethylbutyl)azelate; citrates such as acetyl tri-n-butyl citrate, acetyl triethyl citrate, monoisopropyl citrate, triethyl citrate, mono-, di-, and tri-stearyl citrate; triacetin, p-tert-butyl, n-octyl benzoate, 2-ethylhexyl benzoate, isooctyl benzoate, n-nonyl benzoate, n-decyl benzoate, isodecyl benzoate, 2-propylheptyl benzoate, n-undecyl benzoate, isoundecyl benzoate, n-dodecyl benzoate, isododecyl benzoate, isotridecyl benzoate, n-tridecyl benzoate, triisononyl trimellitate, $C_{13}$-rich $C_{11}$-$C_{14}$-alkyl benzoates, and combinations thereof, and mixtures of thereof. For example, plasticizers useful in the present disclosure may include esters, such as triethylene glycol bis (2-ethylhexanoate) commercially available under the trade designation "Eastman TEG-EH" from Eastman. In some embodiments, diethylene glycol monobenzoate, diethylene glycol dibenzoate, propylene glycol monobenzoate, propylene glycol dibenzoate, polypropylene glycol monobenzoate, polypropylene glycol dibenzoate can be used in combination with the aforementioned plasticizers.

The amount of plasticizer employed, if one is employed, will depend on the nature of the polymeric resin and the plasticizer.

In some embodiments, the presently disclosed polymeric materials may comprise one or more light stabilizers and/or UV-absorbers. Light stabilizers useful in the present disclosure may include, for example, those available under the trade designation "TINUVIN® 292" from Ciba/BASF. UV-absorbers that may find utility in the presently disclosed polymeric material may include, for example, those available under the trade designation "TINUVIN® 1130" from Ciba/BASF.

In some embodiments, the polymeric material may comprise one or more solvents. Solvent should be non-reactive and examples of such includes aliphatic, aromatic or araliphatic solvent. Examples of suitable solvent include methoxypropyl acetate, methoxyethyl acetate, ethylene glycol diacetate, propylene glycol diacetate, glyme, diglyme, dioxane, tetrahydrofuran, dioxolane, tert-butyl methyl ether, ethyl acetate, butyl acetate, chloroform, methylene chloride, chlorobenzene, o-dichlorobenzene, anisole, 1,2-dimethoxybenzene, phenyl acetate, N-methyl-2-pyrrolidone, dimethylformamide, N,N-dimethylacetamide, dimethyl sulphoxide, acetonitrile, phenoxyethyl acetate and/or mixtures thereof, preferably solvent containing ether, ester, or ketone groups, or aromatics, such as methoxypropyl acetate, acetone, 2-butanone, xylene, toluene, cyclohexanone, 4-methyl-2-pentanone, 1-methoxyprop-2-yl acetate, ethylene glycol monomethyl, 3-methoxy-n-butyl acetate, white spirit, more highly substituted aromatics such as are commercially available, for example, under the trade designations "NAPTHA", "SOLVESSO", "ISOPAR", "NAPPAR" from Deutsche EXXON CHEMICAL GmbH, Cologne, Del.; "SHELLSOL" from Deutsche Shell Chemie GmbH, Eschborn, Del.; methyl n-amyl ketone ("MAK") and "AROMATIC 100" "AROMATIC 150" from ExxonMobile Chemical; xylene, methyl isobutyl ketone ("MIBK") and ethyl 3-ethoxypropionate from Eastman Chemical Company; and/or methyl ethyl ketone ("MEK").

Pressure Sensitive Adhesive

In some embodiments, the air and water barrier articles are self-adhering, comprising an adhesive material, preferably a pressure sensitive adhesive material, more preferably a solventless or hot melt pressure sensitive adhesive at least partially coated on an outer major surface of the article. A removable release sheet or liner may advantageously contact the adhesive in order to prevent the adhesive from adhering to the back side (i.e., non-adhesive coated) major surface of the air and water barrier article in roll form, thereby preventing "blocking" of the rolled air and water barrier article. Alternatively, the back side major surface of the air and water barrier article may include an overlaid or overcoated low surface energy release layer or low adhesion backsize (LAB); such embodiments are preferably used in linerless articles.

Any pressure sensitive adhesive used to adhere air and water barrier articles to architectural structures (e.g., buildings) may be used. These include both vapor permeable and vapor impermeable pressure sensitive adhesives. An example of the latter is a rubber modified asphalt (bitumen) pressure sensitive adhesive or a synthetic rubber pressure sensitive adhesive. Such pressure sensitive adhesives are well known in the art.

In some embodiments, the adhesive is selected to be a solventless or hot melt adhesive. In some embodiments, solvent based adhesives or water based adhesives may be used. Exemplary types of adhesives include, for example, radiation-cured, e.g., ultraviolet (UV) radiation or electron-beam cured, (co)polymers resulting from polymerizable monomers or oligomers) may be used. The applied adhesive is preferably tacky (i.e. sticky) and pressure sensitive.

Solventless pressure sensitive adhesives may contain (meth)acrylic homopolymers and copolymers, such as for example isooctyl acrylate, 2-ethylhexyl acrylate. In addition, polar comonomers can be included, such as for example acrylic acid, itaconic acid, 2-carboxy ethyl acrylate, acrylamide and its substituted derivatives. Optional additives include tackifiers, pigments, fillers, UV stabilizers, flame retardants, thixotropic agents, viscosity modifiers, and the like.

Suitable hot melt adhesives may contain such ingredients as (co)polymers such as butyl rubber, styrene-butadiene-styrene (SBS), styrene-isoprene-styrene (SIS), styrene butadiene (SB), styrene-ethylene-butadiene-styrene (SEBS) and ethylene/vinylacetate (EVA); and (meth)acrylic homopolymers and copolymers. The following passage describes additives commonly used in hot melt adhesives. They are not typically used as adhesives by themselves. Resins such as those of the hydrocarbon and rosin types are employed as tackifiers in hot melt adhesives. Natural and petroleum waxes, oil, and bitumen are used as additives.

Solvent-based adhesives may contain ingredients such as those listed above, dissolved or dispersed in a solvent vehicle. Water based adhesives would normally be based on emulsions of (co)polymeric materials. Suitable (co)polymeric materials include vinyl acetate and (meth)acrylic homopolymers and copolymers. Water based adhesives may have the disadvantage that they generally require the additional use of drying ovens or heat lamps to evaporate the water.

If a vapor permeable pressure sensitive adhesive is used, the air and water barrier article may be completely coated on one side. If a vapor impermeable pressure sensitive adhesive is used, then the air and water barrier article may be only partially coated with adhesive, typically in the range of about 10% to 90%, more typically about 30% to 80%, most typically 40% to 70%, of the surface area of the sheet. In other words, at least 10% to 90%, preferably 30% to 80%, most preferably 40% to 70%, of the surface area of the air and water barrier article should be adhesive-free in order to maintain sufficient vapor permeability of the article.

The adhesive may suitably be applied at a thickness of 0.001 inches to 0.1 inch (about 2.54-254 millimeters), but is preferably applied at a thickness of 0.003 inches to 0.025 inches (about 7.62-63.5 millimeters) and most preferably at a thickness of 0.005 inches to 0.02 inches (about 0.127-0.508 millimeters).

As noted above, the adhesive may be contacted by a strippable release sheet or liner to enable packaging in rolls. Suitable release sheets are paper or (co)polymer film sheets with an overlaying, low surface energy (e.g., silicone) release surface coating.

In some embodiments, release sheets or liners useful in the present disclosure include those made a using a method for producing an at least partially cured layer (optionally a fully cured layer), the method including applying a layer comprising a (meth)acrylate-functional siloxane to a surface of a substrate, and irradiating the layer in a substantially inert atmosphere with a short wavelength polychromatic ultraviolet light source having a peak intensity at a wavelength of from about 160 (+/−5) nanometers (nm) to about 240 (+/−5) nm to at least partially cure the layer. Optionally, the layer is cured at a curing temperature greater than 25° C.

Thus, in some exemplary embodiments, the material comprising the layer may be heated to a temperature greater than 25° C. during or subsequent to application of the layer to the substrate. Alternatively, the material comprising the layer may be provided at a temperature of greater than 25° C., e.g. by heating or cooling the material comprising the layer before, during, and/or after application of the layer to the substrate. Preferably, the layer is at a temperature of at least 50° C., 60° C. 70° C., 80° C., 90° C., 100° C., 125° C., or even 150° C. Preferably the layer is at a temperature of no more than 250° C., 225° C., 200° C., 190° C., 180° C., 170° C., 160° C., or even 155° C. Release sheets or liners made using such methods are described in detail in WO 2013/032771 A1, the entirety of which is herein incorporated by reference.

Exemplary Coating Apparatus and Processes

Figure 4:
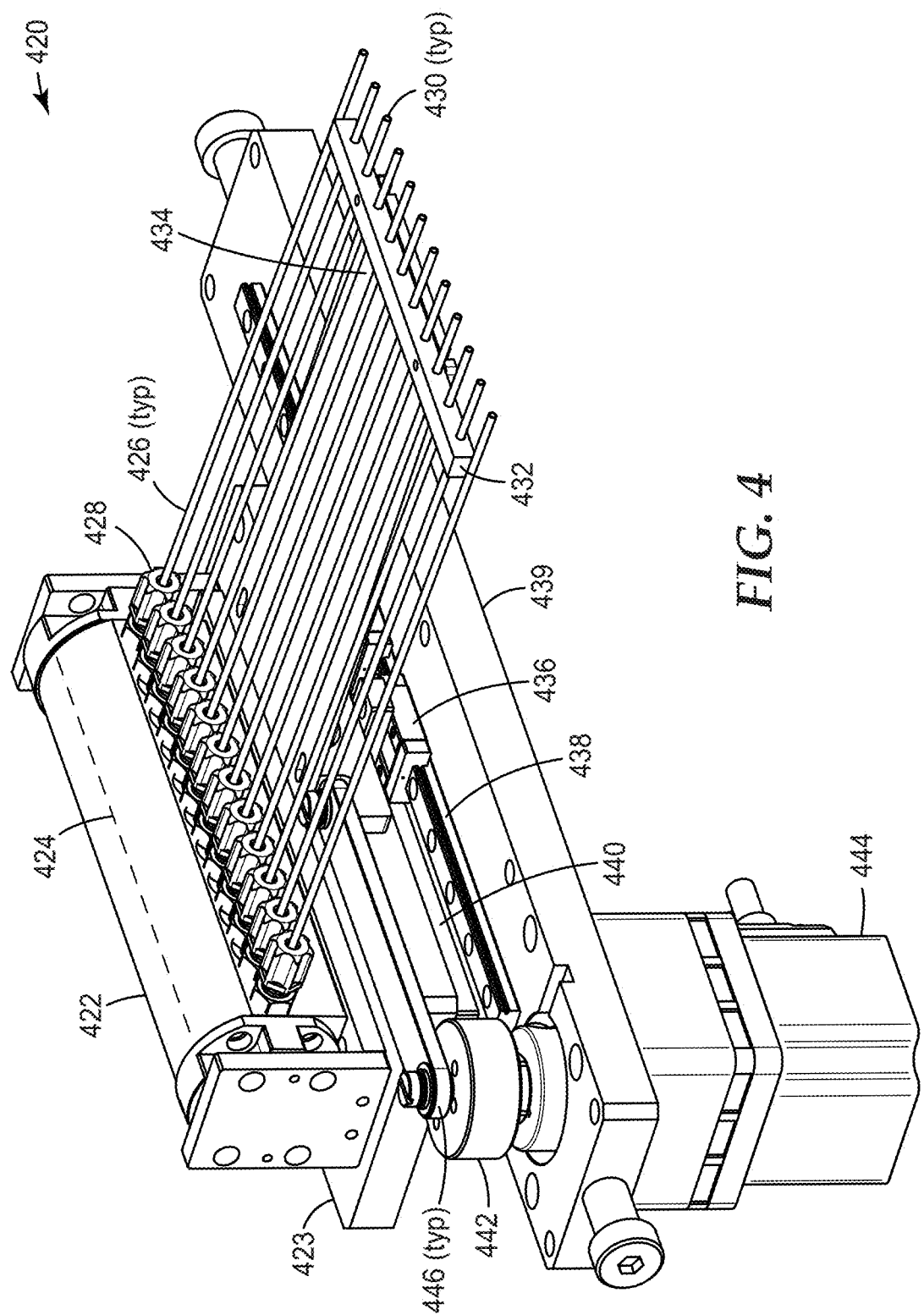
FIG. 4 is a perspective view of a coating apparatus suitable for carrying out the method of the present disclosure.

Referring to FIG. 4, a perspective view of a coating apparatus 420 suitable for carrying out the methods of the present disclosure is illustrated. The coating apparatus 420 includes a distribution manifold 422 on a support 423. Distribution manifold 422 has a cavity 424 internally (rendered in dotted lines in this Figure). A plurality of needle tubes 426 is in fluid communication with cavity 424. Quick release fittings 428 are provided for convenience in cleaning the apparatus 420 between uses, and also to conveniently change the width of the coated pattern to be generated by the apparatus. Quick release fittings from Swagelok of Solon, Ohio are considered suitable. Coating material is supplied to the cavity 424 via an inlet port (on the far side in this view) from a pump.

Needle tubes 426 end in a plurality of dispensing outlets 430, by extension also in fluid communication with the cavity 424. In some embodiments such as the one illustrated, the dispensing outlets 430 form an array. The array may be linear as illustrated in this Figure, but non-linear arrays may be convenient for some purposes. In some convenient embodiments, the dispensing outlets 430 are evenly spaced along the distribution manifold 422, but non-uniform spacing may also be convenient, e.g. when the article coated by apparatus 420 is to be slit in a downstream operation into several portions.

In the illustrated embodiment, the spacing between the needle tubes 426, and by extension the dispensing outlets 430, is secured by an alignment bar 432. Alignment bar 432 is conveniently attached to a plate 434 which is in turn attached to a slide 436. Slide 436 is slideably mounted on a track 438 attached to a frame 439. The motion of slide 436 along track 438 is controlled by a bar 440 pivotally mounted on slide 436. The other end of bar 440 is pivotally mounted on rotor 442, which can be rotated by motor 444. Rotor 442 has several attachment holes 446 at diverse distances from the axis of rotation of motor 444. Though this mechanism, the slide 436 can be placed in reciprocating motion by activating motor 444. By the choice of which attachment hole 446 is selected for the attachment of bar 440, the amplitude of the reciprocating motion is easily changed. The frequency of the reciprocating motion is easily controlled by the speed setting selected for motor 444.

In some embodiments, the needle tubes are conveniently made from stainless steel. Other materials that can be formed into hollow conduits, such as polymers, can also be used. Further, in embodiments such as the one illustrated in FIG. 4 which includes alignment bar 432 and rigid plate 434, it is possible to use non-rigid materials such as silicone rubber tubing to form needle tubes 426.

Figure 5:
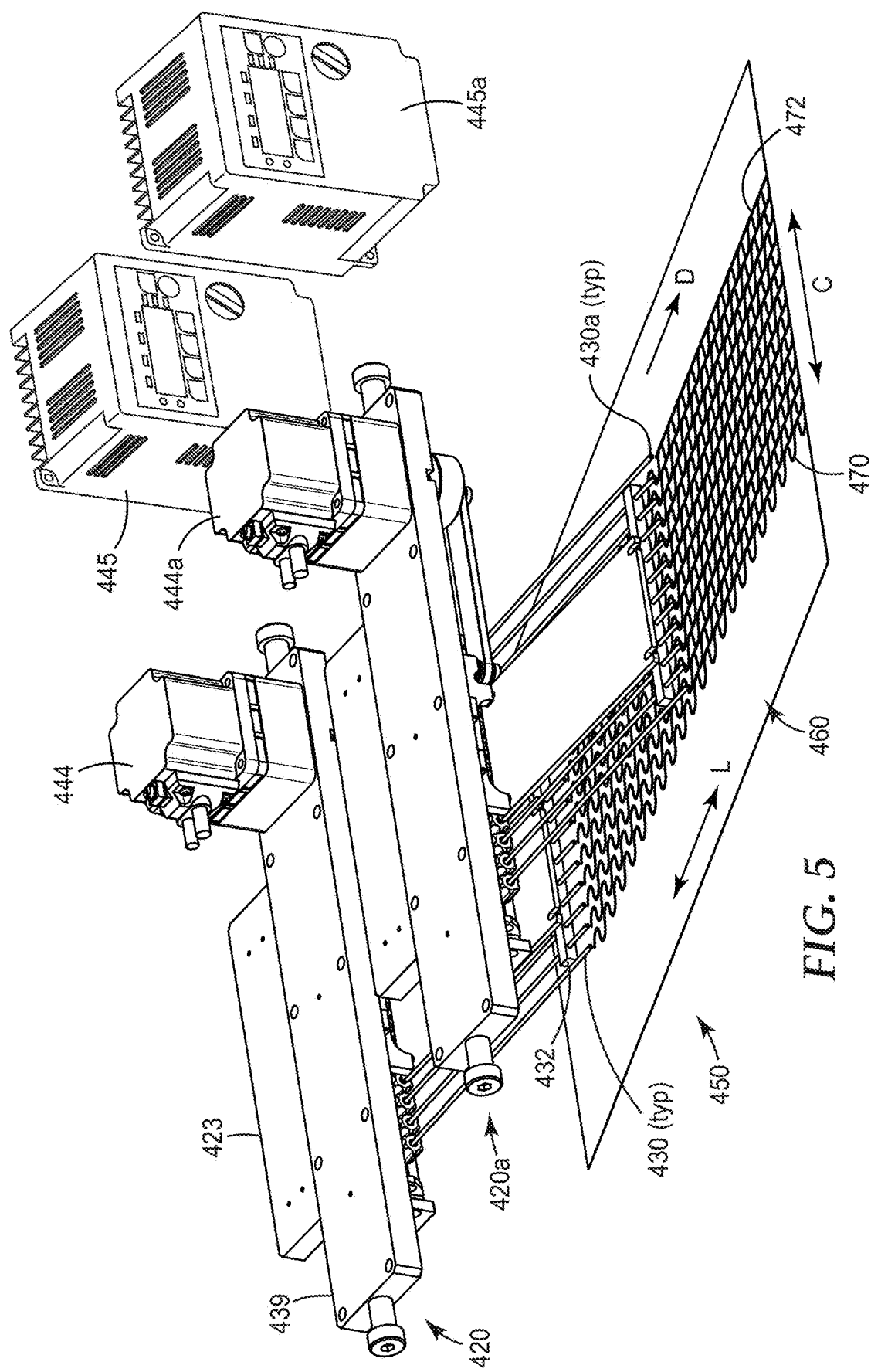
FIG. 5 is a perspective view of a dual coating apparatus.

Referring now to FIG. 5, a dual coating apparatus 450 is illustrated. Dual coating apparatus 450 includes a first distribution manifold 420 and a second distribution manifold 420a. Conveniently, distribution manifold 420 and a second distribution manifold 420a are both constructed as described in FIG. 4, although there is no necessity when there are two or more distribution manifolds for them to be similar. In this Figure, motor controllers 445 and 445a, which control and power motors 444 and 444a on first distribution manifold 420 and second distribution manifold 420a, respectively, are shown. First distribution manifold 420 and a second distribution manifold 420a have first and second dispensing outlets 430 and 430a respectively, positioned adjacent to a substrate 460.

The substrate 460 has a longitudinal direction "L" and a cross direction "C". In this Figure, substrate 460 is being conveyed past dispensing outlets 430 and 430a in a first direction "D". No specific means for conveying the substrate 460 is critical to the utility of the present disclosure, and in general any of the diverse mechanisms known to artisans for this purpose will suffice. While substrate 460 is being conveyed, the first plurality of dispensing outlets 430 is simultaneously translated in a second direction that is non-parallel to the first direction. This is accomplished by operating motor 444 to move alignment bar 432. In the depicted embodiment, that second direction conveniently happens to be identical to cross direction "C," but this identity is not critical to the utility of the present disclosure.

The combination of the movement of substrate 460 in direction "D" while first plurality of dispensing outlets 430 is reciprocated in the "C" direction causes first coating material being dispensed from first plurality of dispensing outlets 430 to be laid onto substrate 460 in sinusoidal patterns 470. Reciprocation rates of between about 0.16 Hz to 6.16 Hz have been found to be convenient. In this Figure, second plurality of dispensing outlets 430a is not being reciprocated, which causes second coating material being dispensed from second plurality of dispensing outlets 430a to be laid onto substrate 460 in straight patterns 472.

A rotor and bar mechanism as depicted in FIGS. 4-5 is not the only mechanism contemplated for translating the dispensing outlets. For example, a stepper motor could be connected by a mechanism to either the distribution manifold or to an alignment bar. A linear displacement transducer could be employed similarly. Such alternatives could be synchronized to the conveying speed of the substrate so that complex non-sinusoidal patterns could be laid down for the first and/or second coating material.

Exemplary Coated Articles

Figure 6:
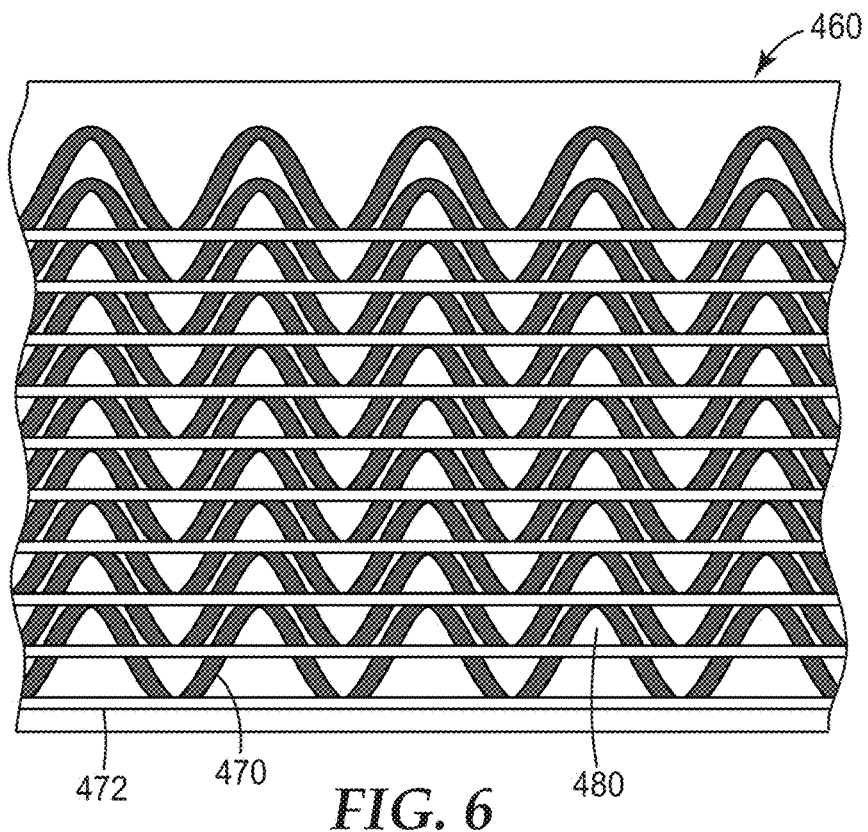
FIG. 6 is a plan view of length of coated substrate prepared by the dual coating apparatus of FIG. 5.

Referring now to FIG. 6, a plan view of length of coated substrate 460 prepared by the dual coating apparatus of FIG. 5, is illustrated. On substrate 460, sinusoidal patterns 470 laid down in a first coating material overlap straight patterns 472 laid down in a second coating material. Such an overlap is not a requirement of the disclosure even when first and second distribution manifolds are in use; the positioning and spacing of the first and second distribution outlets can be arranged so that there is no overlap. The first and the second coating materials may be same or different. In some applications, it may be convenient to create coating-free zones completely surrounded by both the first and the second coating materials on the substrate. Zone 480 is one such zone. The first and the second coating materials may independently be an adhesive. In some applications, the first and second coating materials are both adhesives, formulated so as to particularly adhere advantageously to two distinct surface conditions. For example, in some embodiments, it may be desirable lay down one pattern with an adhesive well adapted to adhere to a dry surface, while additionally laying down one pattern with an adhesive well adapted to adhere to a wet surface. The product will perform regardless of the presenting condition of the patient.

Figure 7:
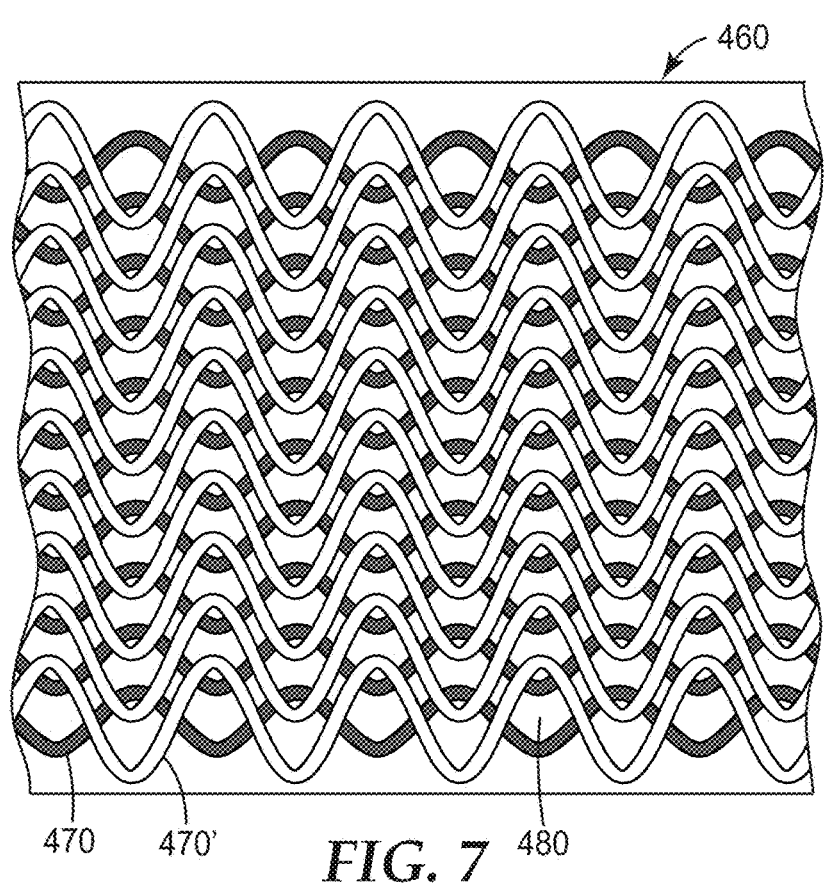
FIG. 7 is a plan view of different length of coated substrate prepared by the dual coating apparatus of FIG. 5.

Referring now to FIG. 7, a plan view of different length of coated substrate 460 prepared by the dual coating apparatus of FIG. 5, is illustrated. On substrate 460, first sinusoidal patterns 470 laid down in a first coating material overlap second sinusoidal patterns 470' laid down in a second coating material. As in the embodiment of FIG. 6, such an overlap is not a requirement of the disclosure, and the first and the second coating materials may be same or different. In some applications, it may be convenient to create coating-free zones completely surrounded by both the first and the second coating materials on the substrate. Zone 480 is one such zone.

Adhesive Patterns

To retain a desired level of water vapor permeance in the air and water barrier articles, the adhesive is preferably applied to the air and water barrier article in a discontinuous manner in order to leave parts, or spots or zones of the major outer surface of the air and water barrier article uncoated with adhesive.

In order to prevent the lateral movement of air between the air and water barrier article and the substrate to which it is bonded, and through lap joints of the air and water barrier article, the adhesive coated areas of the air and water barrier article can be made to intersect to isolate the uncoated areas, thereby eliminating channels through which air can laterally move. This can be achieved by any number of patterns, such as intersecting circles with adhesive free centers, intersecting squares or rectangles of adhesive, intersecting strips in a checkered pattern, etc.

The adhesive may suitably be applied so as to cover 5% to 99% of the area of one side of the membrane, but is preferably applied to cover between 10% and 90% of the area, and most preferably between 50% and 80% of the area, to obtain the optimum balance of adhesion and vapor permeance for the sheet.

Partial coatings of adhesive may be applied in a random fashion or in a specific pattern. Some exemplary partial coatings of adhesive are described, for example, in U.S. Pat. Nos. 3,039,893, 3,426,754, 5,374,477, 5,593,771, 5,895,301, 6,495,229, and 6,901,712.

In some embodiments, the presently disclosed air and water barrier article has a moisture vapor transmission rate of 1 perms or more according to ASTM E96 method. In some embodiments, the presently disclosed air and water barrier article has a moisture vapor transmission rate of 5 perms or more according to ASTM E96 method. In some embodiments, the article has a permeability of greater than 10 perms according to ASTM E 96. In some embodiments, thicknesses of the different layers used in the air and water barrier article are varied to achieve desired permeability of the article.

Surface Modification

In some embodiments, the roll also includes surface modification of the interface between the second major surface of the article and the first major surface of the liner. In some embodiments, the surface modification is used to increase tack or adhesion between the second major surface of the article and the first major surface of the liner when in roll form. Examples of materials or surface treatments useful for increase tack or adhesion between the second major surface of the article and the first major surface of the liner include any chemical or physical surface modifications to any of the second major surface of the article, the first major surface of the liner, or both. For example, a chemical surface modifier can be used. For example, in these cases, surface modification can be done using a primer, adhesive, adhesion promoter, and the like. Physical surface modifiers can also be used to alter the adhesion between the second major surface of the article and the first major surface of the liner. For example, physical surface modifiers useful in the present disclosure include etching, embossing, extrusion onto a textured casting wheel, and the like. The surface treatment can also include corona surface treatment, plasma surface treatment, and the like. Any of these surface modifiers can be used or in combination with one another.

In some embodiments, the surface modification is used to reduce tack or adhesion between the second major surface of the article and the first major surface of the liner. Exemplary materials useful to reduce tack or adhesion between the second major surface of the article and the first major surface of the liner include any inherently non tacky materials that can provide a barrier layer between the second major surface of the article and the first major surface of the liner. For example, in these cases the surface modification can be done using inks, release coatings, slip coatings, and the like. Inks useful in the present disclosure include that commercially available as a liquid, white ink, under the trade designation "DT OPAQUE WHITE" from Sun Chemical Corporation, Carlstadt, N.J.

Applications

In some embodiments, the presently disclosed air and water barrier articles are used as component(s) in building envelope applications. In some embodiments, the presently disclosed air and water barrier article are adhered to architectural structures. Exemplary architectural structures include exterior sheathing, exterior cladding, roofing deck, attic surfaces, boundaries between walls, boundaries between roof systems, foundation surfaces, and the like. Exemplary exterior sheathing materials include plywood, oriented strand board (OSB), gypsum board, foam insulation sheathing, nonwoven glass mat faced gypsum sheathing board, or other conventional sheathing materials commonly used in the construction industry. Useful exterior cladding layer is made up of brick, concrete blocks, reinforced concrete, stone, vinyl siding, fiber cement board, clapboard, or other known exterior siding materials. In some embodiments, the air and water barrier article is applied to a roofing deck, an attic floor or other attic surface, a boundary between a wall, roof system, and/or foundation, other interior or exterior surfaces of a structure, or used as flashing around a roof penetration, windows and doors.

In some embodiments, an applicator is used to apply the presently disclosed rolls of self adhering air and water barrier articles. For example, in some embodiments, the applicator can be inserted in the open ends of the core of the presently disclosed rolls. Commercially available applicators are available under the trade designations "Stretch Band-It" and "Deluxe Hand Saver" from Uline, Hudson, Wis., Exemplary embodiments of the present disclosure have been described above and are further illustrated below by way of the following Examples, which are not to be construed in any way as imposing limitations upon the scope of the present disclosure. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

Following are various embodiments of the present disclosure:

Embodiment 1

A roll comprising an air and water barrier article having opposing first and second major surfaces, a pressure sensitive adhesive disposed on at least the first major surface of the article, and a liner having a first major surface that contacts the opposing second major surface of the article, wherein the pressure sensitive adhesive contacts a second major surface of the liner when wound in the roll.

Embodiment 2

The roll of Embodiment 1 wherein a release strength between the second major surface of the liner and the pressure sensitive adhesive is less than or equal to a release strength between the first major surface of the liner and the second major surface of the article.

Embodiment 3

The roll of any of the preceding Embodiments wherein the liner is coated on at least one of the major surfaces with a release coating.

Embodiment 4

The roll of any of the preceding Embodiments further comprising surface modification at the interface between the second major surface of the article and the first major surface of the liner.

Embodiment 5

The roll of any of the preceding Embodiments wherein a width of the article is greater than or equal to 18 inches.

Embodiment 6

The roll of any of the preceding Embodiments wherein the article is used in building envelope applications.

Embodiment 7

The roll of any of the preceding Embodiments wherein the liner comprises a film selected from at least one of polyester film, paper, polyethylene film, wherein the film is coated on at least one of the major surfaces with a release coating.

Embodiment 8

The roll of any of the preceding Embodiments wherein the liner is derived from applying a layer comprising a (meth)acrylate-functional siloxane to a major surface of a substrate; and irradiating said layer, in a substantially inert atmosphere comprising no greater than 500 ppm oxygen, with a short wavelength polychromatic ultraviolet light source having at least one peak intensity at a wavelength of from about 160 nanometers to about 240 nanometers to at least partially cure the layer, optionally wherein the layer is cured at a curing temperature greater than 25° C.

Embodiment 9

The roll of any of the preceding Embodiments wherein the article passes Modified Test 1 of ASTM D-1970/D-1970M-13, Modified Test 2 of ASTM D-1970/D-1970M-13, or Modified Test 3 of ASTM D-1970/D-1970M-13.

Embodiment 10

The roll of any of the preceding Embodiments wherein the article is water vapor permeable.

Embodiment 11

The roll of any of the preceding Embodiments wherein the article comprises a porous layer at least partially impregnated with a polymeric material wherein a first major surface of the porous layer is covered with the polymeric material.

Embodiment 12

The roll of any of Embodiments 1 to 10 wherein the article comprises a porous layer at least partially impregnated and encapsulated with a polymeric material.

Embodiment 13

The roll of any of Embodiments 1 to 10 wherein the article comprises a major surface of a porous layer that is coated with a polymeric material.

Embodiment 14

The roll of any of the preceding Embodiments wherein the pressure sensitive adhesive comprises a first pressure sensitive adhesive that is pattern coated on the first major surface of the article.

Embodiment 15

The roll of Embodiment 14 further comprising a second pressure sensitive adhesive that is pattern coated on the first major surface of the article.

Embodiment 16

The roll of Embodiment 15 wherein the first and sensitive adhesives are different pressure sensitive adhesives.

Embodiment 17

The roll of any of the preceding Embodiments wherein the polymeric material comprises a polyoxyalkylene polymer having at least one end group derived from an alkoxy silane.

Embodiment 18

The roll of Embodiment 17 wherein all of the end groups of the polyoxyalkylene polymer are silyl terminated.

Embodiment 19

The roll of Embodiments 17 or 18 wherein the polyoxyalkylene polymer further comprises at least one silyl modified branched group.

Embodiment 20

The roll of any of the preceding Embodiments wherein the polymeric material is a solid material or a foam material.

Embodiment 21

The roll of Embodiment 20 wherein the foam material comprises closed cell foam.

Embodiment 22

A self adhering air and water barrier article derived from the roll of any of the preceding Embodiments.

Embodiment 23

The self adhering air and water barrier article of Embodiment 22 disposed on a major surface of a building component.

EXAMPLES

The following examples are intended to illustrate exemplary embodiments within the scope of this disclosure. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Materials

| | |
|---|---|
| KANEKA MS POLYMER S203H | A liquid, silyl-terminated polyether derived from a polyether polymer backbone and having methyldimethoxysilane functional groups and a viscosity of 6000 to 10,000 centiPoise, available under the trade designation KANEKA MS POLYMER S203H from Kaneka North America, LLC, Pasadena, TX. |
| AEROSIL R202 | A hydrophobic fumed silica after treated with a polydimethylsiloxane, available under the trade designation AEROSIL R202 from Evonik Corporation, Parsippany, NJ. |
| OMYACARB 5-FL | A beneficiated calcium carbonate having a mean particle size of 6.3 micrometers and a calcium carbonate content of 98%, available under the trade designation OMYACARB 5-FL from Omya Incorporated, Cincinnati, OH. |
| TIONA 696 | A non-chalking, chlorie-process rutile titanium dioxide pigment having a titanium dioxide content of 92%, and a surface treatment of alumina, silica, organic, available under the trade designation TIONA 696 from Cristal, Hunt Valley, MD. |
| DYNASYLAN DAMO-T | A liquid, bifunctional organosilane having two reactive amino groups and hydrolyzable inorganic methoxysilyl groups, available under the trade designation DYNASYLAN DAMO-T from Evonik Corporation, Parsippany, NJ. |
| DYNASYLAN VTMO | A liquid, bifunctional organosilane having a reactive vinyl group and a hydrolyzable inorganic trimethoxysilyl group, available under the trade designation DYNASYLAN VTMO from Evonik Corporation, Parsippany, NJ. |
| NEOSTAN U-220H | A liquid catalyst based on dibutyl tin bis(acetylacetoacetonate) having a tin content of 27.5%, available under the trade designation NEOSTAN U-220H from Nitto Kasei Company, Ltd., Osaka, Japan. |
| REEMAY 2024 | A spunbond polyester fabric having an areal weight of 71.4 grams/square meter, a thickness of 0.31 millimeters, and a TEXTEST Air Perm of (1626 liters/second)/square meter (320 cubic feet/minute)/square foot), available under the trade designation REEMAY 2024 from Fiberweb Filtration Business, Old Hickory, TN. |
| IOA | isooctyl acrylate |
| AA | acrylic acid |
| IRGACURE 651 | 2-dimethoxy-2-phenylacetophenone, a photoinitiator available under the trade designation IRGACURE 651 from available from BASF Corporation, Florham Park, NJ. |
| FORAL 85LB | A glycerol ester of highly hydrogenated wood rosin, available under the trade designation FORAL 85LB from Pinova Incorporated, Brunswick GA. |
| Triazine | 2,6-bis-trichoromethyl-6-(3,4-dimethoxyphenyl)-s-triazine |
| ULTRA-PFLEX | A precipitated calcium carbonate having an average particle size of 0.07 micrometers and which has been surface treated, available under the trade designation ULTRA-PFLEX from Specialty Minerals, Incorporated, Bethlehem, PA. |
| TP39966 FL | A treated, beneficiated calcium carbonate having a mean diameter of 5 micrometers, available under the trade designation TP39966 FL from Omya Incorporated, Cincinnati, OH. |
| OMYABOND 700 FL | A stearic acid surface treated, ground calcium carbonate having a median diameter of 2.7 micrometers, available under the trade designation from OMYABOND 700 FL from Omya Incorporated, Cincinnati, OH. |
| SILVERLINE 202 | A talc having a median diameter of 19.8 micrometers, available under the trade designation SILVERLINE 202 from Imerys Ceramics, North America, Roswell, GA. |
| LUTRADUR LD-7240 | A white, spunbonded filter media containing 100% polyester fibers having an areal weight of 40.7 grams/square meter (1.2 ounces/square yard), available under the traded designation LUTRADUR LD-7240 from Midwest Filtration, LLC, Cincinnati, OH. |
| KANEKA MS POLYMER S303H | A liquid, silyl-terminated polyether derived from a polyether polymer backbone and having methyldimethoxysilane functional groups and a viscosity of 10,000 to 15,000 centiPoise, available under the trade designation KANEKA MS POLYMER S303H from Kaneka North America, LLC, Pasadena, TX. |
| GENIOSIL XL 65 | A liquid, alkoxysilane having an O-methyl carbamate organofunctional group, N-Dimethoxy(methyl)silyhnethyl-O-methyl-carbamate, having utility as a water scavenging compound, available under the trade designation GENIOSIL XL 65 from Wacker Chemie AG, Munchen, Germany. |

| | |
|---|---|
| STAYBELITE ESTER 3-E ESTER of HYDROGENATED ROSIN | A highly tacky liquid ester of hydrogenated rosin having an acid number of 8 milligrams KOH/gram and a Brookfield viscosity (Spindle 31) of 22,000 mPascals-seconds, available under the trade designation STAYBELITE ESTER 3-E ESTER of HYDROGENATED ROSIN from Eastman Chemical Company, Kingsport, TN. |
| CLOPAY BR-134U | A white, microporous, breathable film having an embossed pattern thereon, an areal weight of 19 grams/square meter, and a moisture vapor transmission rate of (7500 grams H2O/day), believed to be mixture of a greater amount of linear low density polyethylene and a lesser amount of low density polyethylene, the mixture being modified with calcium carbonate and a styrene triblock polymer, available under the trade designation CLOPAY BR-134U White Breathable Film from Clopay Plastic Products Company, Mason, OH. |
| KANEKA MS POLYMER MAX951 | A liquid mixture of silyl-terminated polyether and a silyl-modified acrylics having a Brookfield viscosity at 23 of 35.7 to 59.3 Pa-second, available under the trade designation KANEKA MS POLYMER MAX951 from Kaneka North America, LLC, Pasadena, TX. |
| KANEKA MS POLYMER S227 | A liquid, silyl-terminated polyether derived from a polyether polymer backbone and having methyldimethoxysilane functional groups and a viscosity of 25,000 to 43,000 centiPoise, available under the trade designation KANEKA MS POLYMER S227 from Kaneka North America, LLC, Pasadena, TX. |
| UNIPRO 125 | A white spunbond filter media containing 100% polypropylene and having an areal weight of 42.4 grams/square meter (1.25 ounces/square yard) and an air permeability of [(2245 liters/second)/square meter] ([(442 cubic feet/minute)/square foot]), available under the designation UNIPRO 125 From Midwest Filtration, LLC, Cincinnati, OH. |
| UNIPRO 150 SMS | A white spunbond/meltblown/spunbond filter media containing 100% polypropylene and having an areal weight of 51.2 grams/square meter (1.50 ounces/square yard) and an air permeability of [(518 liters/second)/square meter] ([(102 cubic feet/minute)/square foot]), available under the designation UNIPRO 151 SMS From Midwest Filtration, LLC, Cincinnati, OH. |
| KANEKA MS POLYMER S327 | A liquid, silyl-terminated polyether derived from a polyether polymer backbone and having methyldimethoxysilane functional groups viscosity 25,000 to 43,000 centiPoise, available under the trade designation KANEKA MS POLYMER S327from Kaneka North America, LLC, Pasadena, TX. |
| RELEASE LINER 1 | A 0.004 in. (102 micrometer) thick, 58 pound polycoated Kraft paper release liner having a silicone acrylate release coating on both sides was prepared using the process described in Example 61 of US 20130059105. |
| RELEASE LINER 2 | A 51 micrometer (0.002 inch) thick, polyester film having a silicone treatment on both sides, available as 2.0 CL PET U4162/U4162 from Loparex, Hammond, WI. |
| RELEASE LINER 3 | A 102 micrometer (0.004 in.) thick, high density polyethylene film with silicone treatment on one side, available as 4 BU DHP UE1094B/000 from Loparex, Hammond, WI. |
| RELEASE LINER 4 | A red pigmented, multilayer, thermoplastic olefin film containing a proprietary blend of high density polyethylene and low density polyethylene, having a thickness of about 63 micrometers (0.0025 inches), obtained from Iso Poly Films, Incorporated, Gray Court, SC. |
| RELEASE LINER 5 | A 51 micrometer (0.002 inch) thick polyester film. |
| INK 1 | A liquid, white ink, available as DT OPAQUE WHITE from Sun Chemical Corporation, Carlstadt, NJ. |
| UCON 50-HB-400 | A monobutyl ether of a linear polymer of ethylene oxide:propylene oxide (1:1) polyglcyol, having a number average molecular weight (Mn) of approximately 1230 and a viscosity index (VI) of 220 (ASTM D2270, IP 226), available under the trade designation UCON LUBRICANT 50-HB-400 from Dow Chemical Company, Midland, MI. |
| 2CEA | 2-Carboxyethyl acrylate (beta-carboxyethyl acrylate), a slightly viscous liquid containing 30-35 wt % of 2-carboxyethyl acrylate, 50-60 wt % of acrylic acid oligomers, and 10-20 wt % of acrylic acid, having an acid number of 6.4 milliequivalents/gram, available from Bimax Incorporated, Glen Rock, PA. |

Test Methods
Nail Sealability

Nail sealability of air and water barrier articles was evaluated generally as described in ASTM D-1970/D-1970M-13: "Standard Specification for Self-Adhering Polymer Modified Bituminous Sheet Materials Used as Steep Roofing Underlayment for Ice Dam Protection", Paragraph 7.9: "Self Sealability. Head of Water Test" with some modifications. All materials were conditioned at (23° C. (73° F.)) for at least 24 hours prior to use. Three different modified tests were employed. Samples were considered to have passed the test if a rating of "A" or "B" was achieved.

Modified Test 1 of ASTM D-1970/D-1970M-13

A plywood substrate having a thickness of 1.25 cm (0.5 inches) was employed; four nails were driven through the air and water barrier article into the plywood substrate until 6.35 millimeters (0.25 inches) remained above the exposed surface of the air and water barrier article; and a red dye was added to the water. After exposure the surface of plywood substrate in contact with the air and water barrier article (referred to herein as the "topside"), and the surface of the plywood substrate opposite the topside (referred to herein as the "bottomside") were inspected visually by unaided eye for signs of water leakage as determined by the presence of red-stained areas around each of the four nails. Such stained areas would be indicative of failure of the air and water barrier article to form a seal around the nails. Samples were rated "A" if 3 or 4 of the nail areas on the plywood substrate were free of dye staining; "B" if 2 of the nail areas on the plywood substrate were free of dye staining; and "C" if 1 or 0 of the nail areas on the plywood substrate were free of dye staining.

Modified Test 2 of ASTM D-1970/D-1970M-13

Modified Test 2 was conducted in the same manner as Modified Test 1 with the following change. The four nails were driven through the air barrier article into the plywood substrate until the nail head contacted the top surface of the air and water barrier article, then the nail was backed out until 6.35 millimeters (0.25 inches) remained above the exposed surface of the air and water barrier article.

Modified Test 3 of ASTM D-1970/D-1970M-13

Modified Test 3 was conducted in the same manner as Modified Test 2 with the following modification. The nails were not backed out.

Moisture Vapor Transmission Rate

The moisture vapor transmission rates of air and water barrier articles were evaluated generally as described in ASTM E96/E96M-13: "Standard Test Methods for Water Vapor Transmission of Materials" using Paragraph 11: Dessicant Method at (23° C. (73° F.)) and 50% relative humidity, with the following modifications. One specimen was evaluated, with the pressure sensitive adhesive facing into the Petri dish; six data points were obtained and used to calculate a permeance value. The six individual values were used to determine an average permeance value which was reported in units of Perms.

180° Angle Peel Adhesion Test 1 (Easy Side Release=Adhesive Strength)

The 180 degree angle peel adhesion strength between the release liner and pattern coated pressure sensitive adhesive, also referred to herein as the "easy side release", was measured on a laminate of release liner/pattern coated pressure sensitive adhesive/porous layer. Adhesive strength was measured after aging for seven days at 23° C. and 50% relative humidity. A 2.54 centimeter wide by approximately 20 centimeter (1 inch by 8 inch) long sample of the laminate was cut using a specimen razor cutter. The exposed release liner surface was attached lengthwise to the previously cleaned aluminum platen surface of a peel adhesion tester (Model SP3M90, IMASS Incorporated, Accord, Mass.). The laminate was then rolled down one time in one direction with a 2 kilograms (4.4 pounds) rubber roller at a rate of 230 centimeters/minute (90 inches/minute). The pressure sensitive adhesive/porous layer was carefully lifted away from the release liner adhered to the platen surface, doubled-back at an angle of 180 degrees, and secured to the clamp of the peel adhesion tester. The 180 degree angle peel adhesion strength was then measured as the pressure sensitive adhesive/porous layer was peeled from the release liner at a rate of 230 centimeters/minute (90 inches/minute). A minimum of two test specimens were evaluated with results obtained in ounces/inch which were used to calculate the average release strength. Release testing was conducted under Condition A described in 180° Angle Peel Adhesion Test 2 (Tight Side Release=Liner Release) below.

180° Angle Peel Adhesion Test 2 (Tight Side Release=Liner Release)

The 180 degree angle peel adhesion strength between the release liner and polymeric material, also referred to herein as the "tight side release", was measured on a laminate of release liner/polymeric material/porous layer. The same procedure as described for "180° Angle Peel Adhesion Test 1 (Easy Side Release=Adhesive Strength)" was used with the following modification. The polymeric material/porous layer was carefully lifted away from the release liner adhered to the platen surface, doubled-back at an angle of 180 degrees, and secured to the clamp of the peel adhesion tester. The 180 degree peel adhesion strength between the release liner and polymeric material was measured after all aging conditions (A, B, and C) given below.

A) After 7 days at 23° C. (73° F.) and 50% relative humidity (RH);

B) After 7 days at 70° C. (158° F.) followed by equilibration for 4 hours at 23° C./50% RH;

C) After 7 days at 32° C. (90° F.) followed by equilibration for 4 hours at 23° C./50% RH.

Adhesion to Wet Substrate

The adhesion strength of an air and water barrier article to a wet substrate was measured generally according to ASTM D3330/D3330M-04: "Standard Test Method for Peel Adhesion of Pressure Sensitive Tape" using "Test Method F—Single Coated Tapes, 90° Peel" and the following parameters. A concrete specimen measuring 40.6 centimeters long by 10.2 centimeters wide by 2.5 centimeters thick (16 inches×4 inches×1 inch) was cut from the side wall of a concrete masonry unit (CMU) (a concrete block measuring 40.6 centimeters long by 20.3 centimeters wide by 20.3 centimeters thick (16 inches×8 inches×8 inches) obtained from Home Depot, Saint Paul, Minn.) and scrubbed with a bristle brush and water to remove the concrete dust from its' surface. After cleaning, the specimen was soaked in water overnight, then removed and blotted dry with a paper towel. Release liner having pattern coated pressure sensitive adhesive thereon was laminated to the exposed surface of the porous layer of a partially impregnated, air and water barrier article using firm hand pressure. The liner was removed prior to testing to expose the pattern coated pressure sensitive adhesive. A sample of the adhesive coated, air and water barrier article measuring 5.1 centimeters (2 inches) wide by 15.2 centimeters (6 inches) long was then adhered, by means of its' pressure sensitive adhesive layer, within 15 minutes to the original (uncut) outer surface of the concrete specimen using a 2.0 kilograms (4.4 pounds) rubber hand roller and rolling twice in each direction. The concrete specimens having the air and water barrier articles adhered thereto were conditioned at 23° C. (73° F.) and 50% relative humidity (RH) for various times (0.25 hours; 24 hours; and 72 hours) prior to testing. Peel adhesion was evaluated at an angle of 90 degrees and a rate of 30.5 centimeters/minute (12 inches/minute) using a tensile tester (Model MTS Sintech 500/S, MTS Systems Corporation, Eden Prairie, Minn.) equipped with a 100 Newton (22.5 pound) load cell. Two samples were tested and the average reported in Newtons/centimeter.

EXAMPLES

Example 1

An air and water barrier article having a porous layer partially impregnated and covered on one side with a polymeric material and having a discontinuous pressure sensitive adhesive layer disposed on the side of the porous layer opposite that coated with the polymeric material was prepared as follows. The polymeric material composition was provided by charging the following materials into a mixing vessel which was then placed in a dual asymmetric centrifuge mixer: 39.8 parts by weight (hereinafter abbreviated as "pbw") of a silyl-terminated polyether, KANEKA MS POLYMER S203H, 1.25 pbw of hydrophobic fumed silica, AEROSIL R202, 26.7 pbw of calcium carbonate OMYACARB 5-FL, and 4.4 pbw of titanium oxide, TIONA 696. After mixing at 2500 rpm for four minutes 0.87 pbw of an aminosilane, DYNASYLAN DAMO-T, 0.87 pbw of a vinyl trimethoxysilane, DYNASYLAN VTMO, and 0.19 pbw of a tin catalyst, NEOSTANN U-220H, were added and mixed at 2500 rpm for two minutes. This final mixture was used to coat a silicone treated, polyethylene-coated side of a Kraft paper release liner using a notch bar coater having a gap setting that was 0.30 millimeters (0.012 inches) greater than the thickness of the release paper. The polymeric material-coated release paper was then laminated to a porous layer, REEMAY 2024 polyester, at room temperature (23° C. (73° F.)) using a hand roller and light pressure. This laminate construction was cured at 93° C. (200° F.) for 8 hours. The release paper then was removed to give a partially impregnated air and water barrier article having a continuous layer of polymeric material on one side of a porous layer, and having an approximate total thickness of 0.33 millimeters (0.0128 inches).

A first pressure sensitive adhesive precursor composition was prepared by mixing 99 parts pbw isooctyl acrylate (IOA), 1 pbw acrylic acid (AA) and 0.04 pbw of a photoinitiator, IRGACURE 651. This mixture was partially polymerized under a nitrogen atmosphere by exposure to low intensity ultraviolet radiation to provide a coatable syrup having a viscosity of about 4000 cps. An additional 0.26 pbw of IRGACURE 651, 0.13 pbw of a Triazine, and 6 pbw of a tackifier, FORAL 85LB, were added to the syrup and mixed until all of the components had completely dissolved to give a first pressure sensitive adhesive precursor composition.

An apparatus generally as depicted in FIG. 5 was used to coat the precursor composition at a line speed of 2.74 meters/minute (9 feet/minute) onto the silicone treated, polyethylene coated side of a Kraft paper release liner. The first pressure sensitive adhesive precursor composition was provided to dispensing outlets on both a first distribution manifold and a second distribution manifold. The dispensing outlets on the first manifold, spaced 12.5 millimeters (0.5 inches) apart, were reciprocated at a rate of 1.67 Hz and a peak-to-peak amplitude of 12.5 millimeters (0.5 inches) in the width-wise direction of the liner as it moved in its' length-wise direction, while the dispensing outlets on the second manifold, spaced 12.5 millimeters (0.5 inches) apart, were kept stationary. The pressure in the cavity of the distribution manifolds was controlled to deliver the coating materials at a combined coating weight of 0.013 grams/square centimeter (32 grains per a 4 inch by 6 inch area). The coated liner was then exposed to an ultraviolet radiation source having a spectral output from 300-400 nanometers with a maximum at 351 nanometers in a nitrogen-rich environment. An irradiance of about 9.0 milliWatts/square centimeter was used during the exposure time, resulting in a total energy of 1800 milliJoules/square centimeter.

The result was a pattern of parallel sinusoids of the first pressure sensitive adhesive composition aligned in the longitudinal direction of the paper liner and positioned between the straight line stripes of the first pressure sensitive adhesive composition, as shown in FIG. 5. The sinusoidal patterns contacted the straight line patterns. The adhesive covered approximately 56% of the area of the liner surface, with approximately two thirds of that being attributable to the sinusoidal patterned adhesive and approximately one third of that being attributable to the straight line patterned adhesive.

For nail sealability evaluation the paper liner containing the pattern-coated pressure sensitive adhesive was transfer laminated using hand pressure to a 12.7 millimeter (0.5 inch) thick piece of plywood substrate. Next, the partially impregnated air and water barrier article was laminated by hand to the plywood substrate such that the exposed surface of the porous layer covered the patterned coated pressure sensitive adhesive layer. The plywood substrate having an adhesive coated, partially impregnated air and water barrier article thereon was then evaluated for nail sealability using test method 1.

Measurement of moisture vapor transmission rate was conducted on a sample prepared by directly laminating the exposed pressure sensitive adhesive surface of the pattern-coated pressure sensitive adhesive paper liner onto the non-coated surface of the partially impregnated air and water barrier article. This was rolled down by hand using a rubber roller to ensure transfer of the adhesive onto the air and water barrier article to give a partially impregnated air and water barrier article having a pattern coated pressure sensitive adhesive on one side and a polymeric material coated on the opposite side. The results are shown in Table 2.

Example 2

Example 1 was repeated with the following modification. The calcium carbonate employed was a combination of 20 pbw OMYACARB 5 FL and 7 pbw ULTRA-PFLEX Example 3

Example 1 was repeated with the following modification. The calcium carbonate employed was TP39966 FL.

Example 4

Example 1 was repeated with the following modification. The calcium carbonate employed was OMYABOND 700 FL.

Example 5

Example 1 was repeated with the following modification. Talc, SILVERLINE 202, was used in place of calcium carbonate.

Example 6

Example 1 was repeated with the following modifications. The porous layer used was LUTRADUR LD-7240 polyester.

Example 7

Example 1 was repeated with the following modifications. The silyl-terminated polyether used was KANEKA MS POLYMER S303H; and 7 pbw of xylene was added at the same time as DYNASYLAN DAMO-T, DYNASYLAN VTMO, and NEOSTANN U-220H.

Example 8

Example 1 was repeated with the following modifications. Equal amounts, 0.44 pbw, of VTMO and a carbamate-functional alkoxysilane stabilizer, GENIOSIL XL 65, were used in place of VTMO.

Comparative Example 1

Example 8 was repeated with the following modifications. The amounts of VTMO and GENIOSIL XL 65 were 0.22 and 0.65 pbw respectively.

Example 9

Example 1 was repeated with the following modifications. The porous layer coated with silyl-terminated polyether was cured for 1 hour, then a second coating of the silyl-terminated polyether was applied to the opposite side of the porous layer in the same manner as the first coating followed by curing for 8 hours. The pressure sensitive adhesive layer was applied to one side. The resulting encapsulated air and water barrier article was evaluated by the modified nail sealability test methods.

Example 10

Example 6 was repeated with the following modifications. The porous layer used was impregnated with the silyl-terminated polyether as follows. A sample of the porous layer, measuring approximately 30.5 centimeters long and 15.2 centimeters wide (12 inches by 6 inches), was immersed in a bath of the silyl-terminated polyether, pulled out by hand, the majority of excess polyether wiped off with a wooden scraper, then hung vertically to provide curing for 24 hours at room temperature. It was then further cured in an oven at 93° C. (200° F.) for eight hours to provide a nontacky, impregnated, encapsulated air and water barrier article. The pressure sensitive adhesive layer was applied to one side. Nail sealability was determined using test method 2.

Comparative Example 2

Example 1 was repeated with the following modifications. Three pbw of a liquid tacky resin, STAYBELITE ESTER 3-E ESTER of HYDROGENATED ROSIN, was included.

Comparative Example 3

Example 1 was repeated with the following modifications. No AEROSIL R202, OMYACARB 5-FL, or TIONA 696 were included.

Example 11

A partially impregnated air and water barrier article having a pattern coated pressure sensitive adhesive on one side and a polymeric material coated on the opposite side was prepared as described in Example 1 using the following materials. Sixty-seven pbw KANEKA MS POLYMER S203H, 1.34 pbw of AEROSIL R202, 26.3 pbw of OMYACARB 5-FL, 4.37 pbw of TIONA 696, 2.0 pbw GENIOSIL XL 65, and 0.22 pbw of NEOSTANN U-220H were used to prepare the polymeric material. A microporous, breathable film having an embossed pattern thereon, CLOPAY BR-134U, was used in place of REEMAY 2024.

Example 12

Example 1 was repeated with the following modifications. A mixture of silyl-containing compounds, KANEKA MS POLYMER MAX951, was used in place of KANEKA MS POLYMER S203H.

Example 13

Example 1 was repeated with the following modifications. A silyl-terminated polyether polymer, KANEKA MS POLYMER S327, was used in place of KANEKA MS POLYMER S203H; and a spunbonded, polypropylene, UNIPRO 125, was used in place of REEMAY 2024.

Example 14

Example 13 was repeated with the following modifications. A silyl-terminated polyether polymer, KANEKA MS POLYMER S227, was used in place of KANEKA MS POLYMER S203H; and a spunbonded, meltblown polypropylene, UNIPRO 150 SMS was used in place of REEMAY 2024.

Example 15

Example 1 was repeated with the following modifications. A liquid, silyl-terminated polyether polymer, KANEKA MS POLYMER S303H, was used in place of KANEKA MS POLYMER S203H; 0.50 pbw NEOSTANN U-220H were used; and 2.09 pbw GENIOSIL XL 65 was used in place of DYNASYLAN VTMO.

Example 16

Example 15 was repeated with the following modification. The amount of GENIOSIL XL 65 used was 0.87 pbw.

Example 17

Example 15 was repeated with the following modification. The amount of GENIOSIL XL 65 used was 0.43 pbw.

TABLE 1A

Example Formulations (wt %)

| Example | 1 | 2 | 3 | 4 | 5 | 6 | 7 | 8 | CE 1 | 9 | 10 |
|---|---|---|---|---|---|---|---|---|---|---|---|
| KANEKA MS POLYMER S203H | 53.7 | 53.7 | 53.7 | 53.7 | 53.7 | 53.7 | | 53.8 | 53.8 | 53.7 | 53.7 |
| KANEKA MS POLYMER S303H | | | | | | | 53.7 | | | | |
| KANEKA MS POLYMER S227 | | | | | | | | | | | |
| KANEKA MS POLYMER S327 | | | | | | | | | | | |
| KANEKA MS POLYMER MAX951 | | | | | | | | | | | |
| AEROSIL R202 | 1.7 | 1.7 | 1.7 | 1.7 | 1.7 | 1.7 | 1.7 | 1.7 | 1.7 | 1.7 | 1.7 |
| OMYACARB 5 FL | 36.2 | 26.8 | | | | 36.2 | 36.2 | 36.0 | 36.0 | 36.2 | 36.2 |
| ULTRA PFLEX | | 9.4 | | | | | | | | | |
| TP39966 FL | | | 36.2 | | | | | | | | |
| OMYABOND700 FL | | | | 36.2 | | | | | | | |
| SILVERLINE 202 | | | | | 36.2 | | | | | | |
| TIONA 696 | 5.8 | 5.8 | 5.8 | 5.8 | 5.9 | 5.8 | 5.8 | 5.9 | 5.9 | 5.8 | 5.8 |
| DYNASYLAN DAMO-T | 1.2 | 1.2 | 1.2 | 1.2 | 1.1 | 1.2 | 1.2 | 1.2 | 1.2 | 1.2 | 1.2 |
| DYNASYLAN VTMO | 1.2 | 1.2 | 1.2 | 1.2 | 1.2 | 1.2 | 1.2 | 0.6 | 0.3 | 1.2 | 1.2 |
| GENIOSIL XL 65 | | | | | | | | 0.6 | 0.9 | | |
| NEOSTANN U220H | 0.3 | 0.3 | 0.3 | 0.3 | 0.3 | 0.3 | 0.3 | 0.3 | 0.3 | 0.3 | 0.3 |
| STAYBELITE ESTER 3 | | | | | | | | | | | |
| XYLENE | | | | | | | 9.5% | | | | |
| Total | 100 | 100 | 100 | 100 | 100 | 100 | 100 | 100 | 100 | 100 | 100 |

TABLE 1B

Example Formulations (wt %)

| Example | CE 2 | CE 3 | 11 | 12 | 13 | 14 | 15 | 16 | 17 |
|---|---|---|---|---|---|---|---|---|---|
| KANEKA MS POLYMER S203H | 51.7 | 95.4 | 66.1 | | | | | | |
| KANEKA MS POLYMER S303H | | | | | | | 52.6 | 53.5 | 53.8 |
| KANEKA MS POLYMER S227 | | | | | | 53.7 | | | |
| KANEKA MS POLYMER S327 | | | | | 53.7 | | | | |
| KANEKA MS POLYMER MAX951 | | | | 53.7 | | | | | |
| AEROSIL R202 | 1.6 | | 1.3 | 1.7 | 1.7 | 1.7 | 1.6 | 1.7 | 1.7 |
| OMYACARB 5 FL | 34.6 | | 26.0 | 36.2 | 36.2 | 36.2 | 35.5 | 36.1 | 36.3 |
| ULTRA PFLEX | | | | | | | | | |
| TP39966 FL | | | | | | | | | |
| OMYABOND700 FL | | | | | | | | | |
| SILVERLINE 202 | | | | | | | | | |
| TIONA 696 | 5.7 | | 4.3 | 5.8 | 5.8 | 5.8 | 5.7 | 5.8 | 5.9 |
| DYNASYLAN DAMO-T | 1.1 | 2.1 | | 1.2 | 1.2 | 1.2 | 1.1 | 1.2 | 1.2 |
| DYNASYLAN VTMO | 1.1 | 2.1 | | 1.2 | 1.2 | 1.2 | | | |
| GENIOSIL XL 65 | | | 2.0 | | | | 2.7 | 1.2 | 0.6 |
| NEOSTANN U220H | 0.2 | 0.5 | 0.2 | 0.3 | 0.3 | 0.3 | 0.7 | 0.6 | 0.6 |
| STAYBELITE ESTER 3 | 3.9 | | | | | | | | |
| XYLENE | | | | | | | | | |
| Total | 100 | 100 | 100 | 100 | 100 | 100 | 100 | 100 | 100 |

Results

TABLE 2

Nail Sealability (Test 1) and Moisture Vapor Transmission Rate

| | Nail Sealability | | Moisture Vapor Transmission Rate | |
| --- | --- | --- | --- | --- |
| | | | | Thickness |
| Ex. | Top Side Test 1 | Bottom Side Test 1 | Permeance (Perms) | (without adhesive) (mm) |
| 1 | A | A | 12.29 | 0.325 |
| 2 | A | A | 18.56 | 0.345 |
| 3 | A | A | 16.34 | 0.320 |
| 4 | A | A | 17.44 | 0.322 |
| 5 | A | A | ND | 0.301 |
| 6 | A | A | 13.37 | ND |
| 7 | C | A | ND | 0.302 |
| 8 | A | A | ND | 0.272 |
| CE 1 | C | C | 12.40 | 0.268 |
| 9 | A | A | 7.23 | ND |
| 10 | ND | ND | ND | ND |
| CE 2 | C | C | 16.67 | 0.263 |
| CE 3 | C | C | 16.83 | 0.244 |
| 11 | A | A | ND | ND |
| 12 | A | A | ND | 0.290 |
| 13 | A | A | ND | ND |
| 14 | A | A | ND | ND |
| 15 | A | A | ND | ND |
| 16 | A | A | ND | ND |
| 17 | C | B | ND | ND |

TABLE 3

Nail Sealability (Test 2) and Moisture Vapor Transmission Rate

| | Nail Sealability | | Moisture Vapor Transmission Rate | |
| --- | --- | --- | --- | --- |
| | | | | Thickness |
| Ex. | Top Side Test 2 | Bottom Side Test 2 | Permeance (Perms) | (without adhesive) (mm) |
| 9 | C | B | 7.23 | ND |
| 10 | A | A | ND | ND |

Example 18

An air and water article having a porous layer partially impregnated and covered on one side with a polymeric material and having Release Liner 1 disposed on the side of the polymeric material layer opposite the side in contact with the porous layer was prepared and evaluated for "tight side" release as follows. Release Liner 1 coated with polymeric material as described in Example 1. The exposed surface of the polymeric material was then laminated to a porous layer, REEMAY 2024 polyester and cured at 93° C. (200° F.) for 8 hours. The resulting construction was tested for "tight side" release according to the test method "180° Angle Peel Adhesion Test 1 (Liner Release)". The results are shown in Table 4.

Example 19

An air and water barrier article having a porous layer covered on one side with a discontinuous pressure sensitive adhesive layer and having Release Liner 1 disposed on the side of the discontinuous pressure sensitive adhesive layer opposite the side in contact with the porous layer was prepared and evaluated for "easy side" release as follows. A pressure sensitive adhesive precursor composition was prepared, coated onto a polyethylene film having a silicone treatment on both sides, and cured using the process described in Example 1. The pressure sensitive adhesive coated surface of the polyethylene film was then laminated to a porous layer, REEMAY 2024 polyester, at room temperature (23° C. (73° F.)) using a hand roller and negligible pressure. The silicone coated polyethylene film was then removed and Release Liner 1 was laminated to the exposed pressure sensitive adhesive surface at room temperature (23° C. (73° F.)) using a hand roller and light pressure. The side of Release Liner 1 in contact with the pressure sensitive adhesive was the side opposite that which contacted the polymeric material in Example 18. The resulting construction was tested for "easy side" release according to the test method "180° Angle Peel Adhesion Test 2 (Adhesive Strength)". The results are shown in Table 4.

Example 20

Example 18 was repeated with the following modification. Release Liner 2 was used in place of Release Liner 1, and no DYNASYLAN DAMO-T was used in the preparation of the polymeric material.

Example 21

Example 19 was repeated with the following modification. Release Liner 2 was used in place of Release Liner 1, and the side of Release Liner 2 in contact with the pressure sensitive adhesive was the side opposite that which contacted the polymeric material in Example 20.

Example 22

Example 18 was repeated with the following modification. Release Liner 3 was used in place of Release Liner 1 and the polymeric material was in contact with the side of the liner that was not treated with silicone.

Example 23

Example 19 was repeated with the following modification. Release Liner 3 was used in place of Release Liner 1 and the pressure sensitive adhesive was in contact with the side of the liner that was treated with silicone.

Example 24

Example 18 was repeated with the following modification. Release Liner 4 was used in place of Release Liner 1.

Example 25

Example 24 was repeated with the following modification. The release liner was provided with a dot pattern on one side using a handheld flexographic printing unit and INK 1 followed by drying at room temperature. The polymeric material was then coated over the dot pattern. The dots had a diameter of 1.0 millimeters and a center to center spacing of 1.2 millimeters. The dot pattern covered approximately 38% of the release liner surface.

Example 26

Example 25 was repeated with the following modification. The dots had a diameter of 0.5 millimeters and a center to center spacing of 0.7 millimeters. The dot pattern covered approximately 70% of the release liner surface.

Example 27

Example 18 was repeated with the following modifications. Release Liner 5 was used in place of Release Liner 1, and the release liner was provided with a flood coating of INK 1 on one side using a #0 Meyer bar followed by drying at room temperature to provide 100% ink coverage of the liner. The polymeric material was then coated over the ink flood coat.

Example 28

Example 19 was repeated with the following modifications. Release Liner 2 was used in place of Release Liner 1. In addition, a second pressure sensitive adhesive precursor composition was prepared by mixing 32.5 parts pbw IOA, 16.25 pbw of 2-carboxyethyl acrylate (2CEA), 16.25 pbw AA, 35 pbw of UCON 50-HB-400 polyalkylene glycol monobutyl ether, and 0.03 pbw of IRGACURE 651. This mixture was partially polymerized under a nitrogen atmosphere by exposure to low intensity (UV-A) ultraviolet radiation to provide a coatable syrup having a viscosity of about 4000 cps. Next, 0.08 of Triazine and an additional 0.10 pbw of IRGACURE 651 were added to the syrup and mixed until all of the components had completely dissolved to give a second pressure sensitive adhesive precursor composition. This second precursor composition was provided to the second distribution manifold and coated in a straight line onto the paper release liner by the second dispensing outlets in place of the first pressure sensitive adhesive precursor composition. After exposure to UV irradiation, the adhesive coated liner was used to prepare an air and water barrier article having pattern coated pressure sensitive adhesives thereon which was evaluated for "easy side" release according to the test method "180° Angle Peel Adhesion Test 2 (Adhesive Strength)". The results are shown in Table 4.

Example 29

Example 28 was repeated with the following modification. Release Liner 3 was used in place or Release of Liner 2.

TABLE 4

180° Angle Peel Adhesion After 7 Days at 23° C./50% RH

| Ex. | Release Liner | Tight Side Release (oz/in, N/dm) | Easy Side Release (oz/in, N/dm) |
| --- | --- | --- | --- |
| 18 | 1 | 27.2 (29.8) | NA |
| 19 | 1 | NA | 1.2 (1.3) |
| 20 | 2 | 18.6 (20.3) | NA |
| 21 | 2 | NA | 0.9 (1.0) |
| 22 | 3 | 4.2 (4.6) | NA |
| 23 | 3 | NA | 1.5 (1.7) |
| 24 | 4 | 14.7 (16.1) | NA |
| 25 | 4 | 10.6 (11.6) | NA |
| 26 | 4 | 3.4 (3.7) | NA |
| 27 | 5 | 11.9 (13.0) | NA |
| 28 | 2 | NA | 1.2 (1.3) |
| 29 | 3 | NA | 1.2 (1.4) |

NA: not applicable

TABLE 5

180° Angle Peel Adhesion After 7 Days at 70° C.

| Ex. | Release Liner | Tight Side Release (oz/in, N/dm) |
| --- | --- | --- |
| 18 | 1 | Sample delaminated during testing |
| 19 | 1 | NA |
| 20 | 2 | 16.4 (17.9) |
| 21 | 2 | NA |
| 22 | 3 | 7.5 (8.2) |
| 23 | 3 | NA |
| 24 | 4 | 14.4 (15.7) |
| 25 | 4 | 10.8 (11.8) |
| 26 | 4 | 3.3 (3.6) |
| 27 | 5 | 10.2 (11.2) |
| 28 | 2 | NA |
| 29 | 3 | NA |

NA: not applicable

TABLE 6

180° Angle Peel Adhesion After 7 Days at 32° C./90% RH

| Ex. | Release Liner | Tight Side Release (oz/in, N/dm) |
| --- | --- | --- |
| 18 | 1 | 28.3 (31.0) |
| 19 | 1 | NA |
| 20 | 2 | 7.8 (8.5) |
| 21 | 2 | NA |
| 22 | 3 | 6.5 (7.1) |
| 23 | 3 | NA |
| 24 | 4 | 14.3 (15.7) |
| 25 | 4 | 10.8 (11.8) |
| 26 | 4 | 4.3 (4.7) |
| 27 | 5 | 11.7 (12.8) |
| 28 | 2 | NA |
| 29 | 3 | NA |

NA: not applicable

As seen in Tables 3, 4, and 5 release strength values remain relatively stable even after aging for 7 days at 70° C., and/or for 7 days at 90% RH and 32° C. (90° F.) for some examples.

Example 30

Example 30 was prepared in a fashion similar to that described for Example 1, and the resulting partially impregnated air and water barrier article having pattern coated pressure sensitive adhesive thereon was evaluated for adhesion to a wet substrate. The results are shown in Table 7.

Example 31

Example 30 was repeated with the following modification. A second pressure sensitive adhesive precursor composition was provided and employed as described in Example 28 to prepare a partially impregnated air and water barrier article having pattern coated pressure sensitive adhesives thereon which was evaluated for adhesion to a wet substrate. The results are shown in Table 7.

TABLE 7

| | Wet Substrate Adhesion | | |
|---|---|---|---|
| | Wet Substrate Adhesion (N/cm) | | |
| Ex. | 0.25 hours | 24 hours | 72 hours |
| 30 | 0 | 0 | 0 |
| 31 | 0.107 | 0.408 | 3.96 |

Example 32

Example 32 was prepared in a fashion similar to that described for Example 31 and evaluated for nail sealability (test methods 1 and 3) and moisture vapor transmission rate. The results are shown in Table 8.

Example 33

Example 32 was repeated with the following modification. The polymeric material was coated onto silicone treated polyester film instead of the silicone treated, polyethylene-coated side of a Kraft paper release liner.

TABLE 8

| | Nail Sealability (Tests 1 and 3) and Moisture Vapor Transmission Rate | | | | | |
|---|---|---|---|---|---|---|
| | Nail Sealability | | Nail Sealability | | | Moisture Vapor Transmission Rate |
| Ex. | Top Side Test 1 | Bottom Side Test 1 | Top Side Test 3 | Bottom Side Test 3 | Permeance (Perms) | Thickness (without adhesive) (mm) |
| 32 | A | A | A | A | 12.38 | 0.344 |
| 33 | B | A | A | A | 13.48 | 0.348 |

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. Furthermore, all published patent applications and issued patents referenced herein are incorporated by reference in their entirety to the same extent as if each individual publication or patent was specifically and individually indicated to be incorporated by reference. Various exemplary embodiments have been described. These and other embodiments are within the scope of the following listing of disclosed embodiments.

What is claimed is:

1. A roll comprising:
   an air and water barrier article having opposing first and second major surfaces;
   a pressure sensitive adhesive disposed on at least the first major surface of the air and water barrier article; and
   a liner comprising a substrate and having a first major surface that contacts the opposing second major surface of the air and water barrier article, wherein the pressure sensitive adhesive contacts a second major surface of the liner when wound in the roll,
   wherein the air and water barrier article comprises a porous layer having a major surface that is coated with a polymeric material, wherein the polymeric material comprises a polyoxyalkylene polymer having at least one end group derived from an alkoxy silane.

2. The roll of claim 1, wherein a release strength between the second major surface of the liner and the pressure sensitive adhesive is less than or equal to a release strength between the first major surface of the liner and the second major surface of the air and water barrier article.

3. The roll of claim 1, wherein the liner is coated on at least one of its first or second major surfaces with a release coating.

4. The roll of claim 1, further comprising surface modification at the interface between the second major surface of the air and water barrier article and the first major surface of the liner.

5. The roll of claim 1, wherein a width of the air and water barrier article is greater than or equal to 18 inches.

6. The roll of claim 1, wherein the substrate comprises at least one of polyester film, paper, or polyethylene film, wherein the substrate is coated on at least one major surface with a release coating.

7. The roll of claim 1, wherein the liner is derived from applying a layer comprising a (meth)acrylate-functional siloxane to a major surface of the substrate; and irradiating said layer, in a substantially inert atmosphere comprising no greater than 500 ppm oxygen, with a short wavelength polychromatic ultraviolet light source having at least one peak intensity at a wavelength of from about 160 nanometers to about 240 nanometers to at least partially cure the layer, optionally wherein the layer is cured at a curing temperature greater than 25° C.

8. The roll of claim 1, wherein the air and water barrier article passes at least one of Modified Test 1 of ASTM D-1970/D-1970M-13, Modified Test 2 of ASTM D-1970/D-1970M-13, or Modified Test 3 of ASTM D-1970/D-1970M-13.

9. The roll of claim 1, wherein the air and water barrier article is water vapor permeable.

10. The roll of claim 1, wherein the porous layer is at least partially impregnated with the polymeric material, and wherein the major surface of the porous layer is covered with the polymeric material.

11. The roll claim 1, wherein the porous layer is at least partially impregnated and encapsulated with the polymeric material.

12. The roll of claim 1, wherein the pressure sensitive adhesive comprises a first pressure sensitive adhesive that is pattern coated on the first major surface of the air and water barrier article.

13. The roll of claim 12, further comprising a second pressure sensitive adhesive that is pattern coated on the first major surface of the air and water barrier article.

14. The roll of claim 13, wherein the first and second pressure sensitive adhesives are different pressure sensitive adhesives.

15. The roll of claim 1, wherein all of the end groups of the polyoxyalkylene polymer are silyl terminated.

16. The roll of claim 1, wherein the polyoxyalkylene polymer further comprises at least one silyl modified branched group.

17. The roll of claim 1, wherein the polymeric material is a solid material or a foam material.

18. A self-adhering air and water barrier article derived from the roll of claim 1, wherein the self-adhering air and water barrier article comprises the air and water barrier article having opposing first and second major surfaces, the pressure sensitive adhesive disposed on at least the first major surface of the air and water barrier article, and the liner having the first major surface in contact with the opposing second major surface of the air and water barrier article.

19. The self-adhering air and water barrier article of claim 18 disposed on a major surface of a building component.

20. The roll of claim 17, wherein the foam material comprises closed cell foam.

* * * * *